(12) United States Patent
Crook et al.

(10) Patent No.: US 6,705,942 B1
(45) Date of Patent: Mar. 16, 2004

(54) METHOD AND APPARATUS FOR MANAGING GOLF RELATED INFORMATION OBTAINED IN PART BY USING IMPULSE RADIO TECHNOLOGY

(75) Inventors: Dale W. Crook, Alpharetta, GA (US); Larry W. Fullerton, Brownsboro, AL (US); Donald A. Kelly, Niceville, FL (US)

(73) Assignee: Golf-Domain.com LLC, Alpharetta, GA (US)

( * ) Notice: Subject to any disclaimer, the term of this patent is extended or adjusted under 35 U.S.C. 154(b) by 494 days.

(21) Appl. No.: 09/619,295

(22) Filed: Jul. 19, 2000

(51) Int. Cl.[7] .................................................. A63F 9/24
(52) U.S. Cl. .......................................... 463/3; 473/131
(58) Field of Search .................................. 463/3, 40–42; 473/131, 405–407, 409, 150; 342/21, 118, 125, 127–135, 450, 458, 463; 375/130, 135–136, 259–260, 353

(56) References Cited

U.S. PATENT DOCUMENTS

| | | | |
|---|---|---|---|
| 4,641,317 A | 2/1987 | Fullerton | 375/1 |
| 4,743,906 A | 5/1988 | Fullerton | 342/27 |
| 4,813,057 A | 3/1989 | Fullerton | 375/37 |
| 4,979,186 A | 12/1990 | Fullerton | 375/1 |
| 5,319,548 A | 6/1994 | Germain | 364/410 |
| 5,363,108 A | 11/1994 | Fullerton | 342/27 |
| 5,438,518 A | 8/1995 | Bianco et al. | 364/460 |
| 5,507,485 A | 4/1996 | Fisher | 273/32 |
| 5,524,081 A | 6/1996 | Paul | 364/460 |
| 5,677,927 A | 10/1997 | Fullerton et al. | 375/200 |
| 5,687,169 A | 11/1997 | Fullerton | 370/324 |
| 5,832,035 A | 11/1998 | Fullerton | 375/210 |
| 5,852,672 A | 12/1998 | Lu | 382/154 |
| 5,927,603 A | 7/1999 | McNabb | 239/63 |

FOREIGN PATENT DOCUMENTS

| | | |
|---|---|---|
| GB | 2 283 144 A | 4/1995 |
| WO | WO 99/47216 A1 | 9/1999 |
| WO | WO 99/49333 A1 | 9/1999 |
| WO | WO 00/36520 A1 | 6/2000 |
| WO | WO 01/08116 A2 | 2/2001 |

OTHER PUBLICATIONS

PCT International Search Report for International Application No. PCT/US01/22650 dated May 3, 2002.

*Primary Examiner*—Kim Nguyen
(74) *Attorney, Agent, or Firm*—William J. Tucker

(57) ABSTRACT

An apparatus, system and method are provided that can overcome the shortcomings of traditional golf course positioning systems by utilizing impulse radio technology to obtain golf related information that can be used by one or more users. For instance, golfers may use the golf related information to help them make informed decisions while playing golf on the golf course. And, golf trainers can use the golf related information associated with a particular golfer to help that golfer improve their game. In addition, golf course personnel can use the golf related information to help manage and increase the profitability of the golf course. Moreover, golf businesses can use the golf related information to help them verify the accuracy of advertising claims made by their competitors. These are just some of the uses and advantages of the present invention.

21 Claims, 18 Drawing Sheets

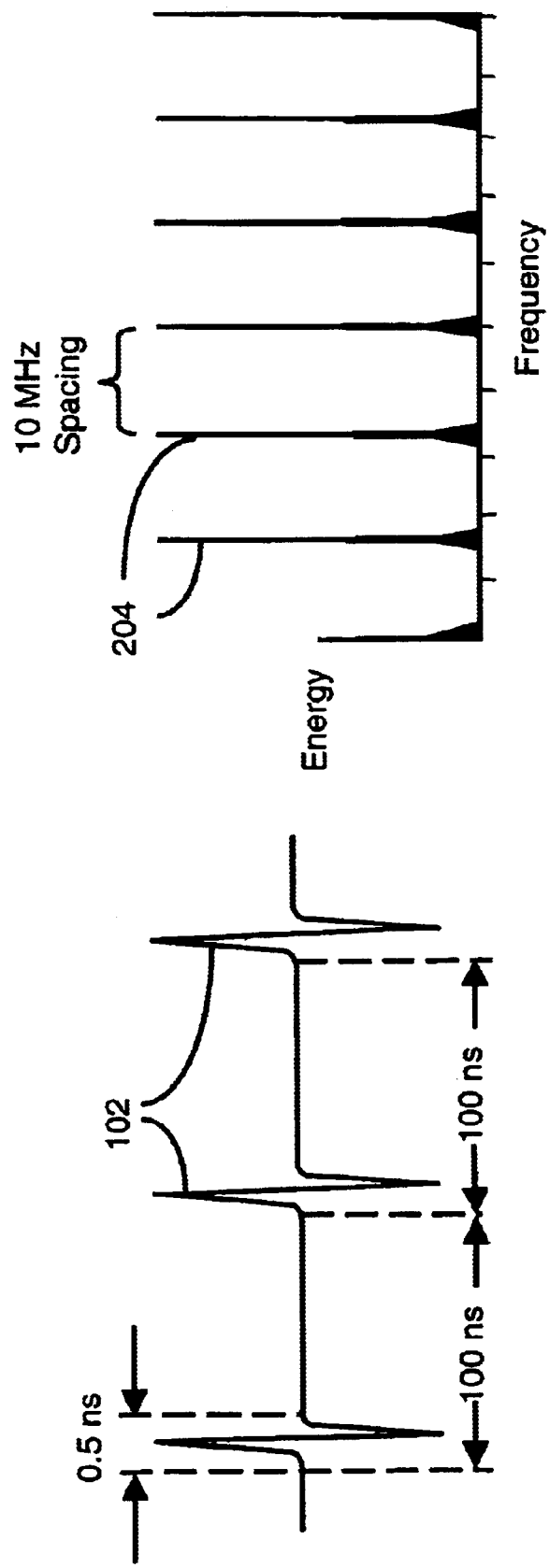

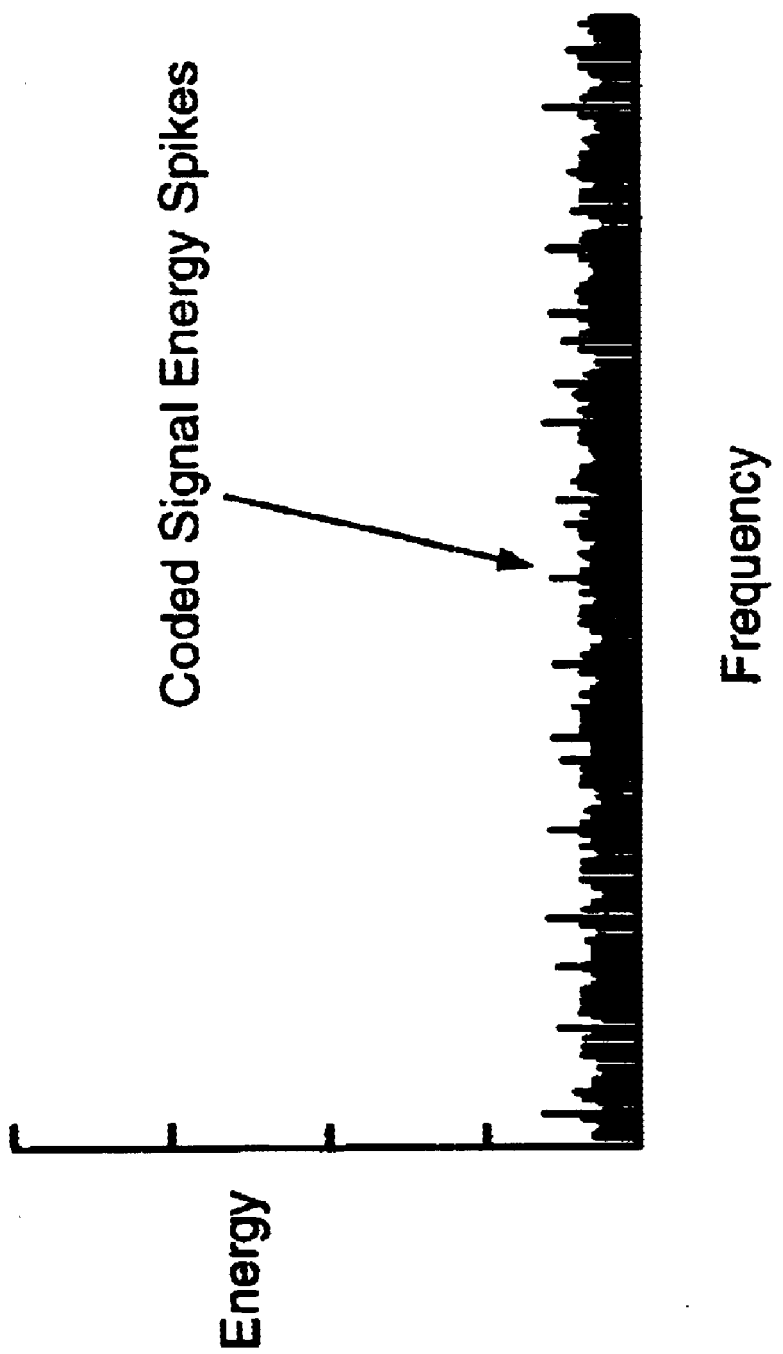

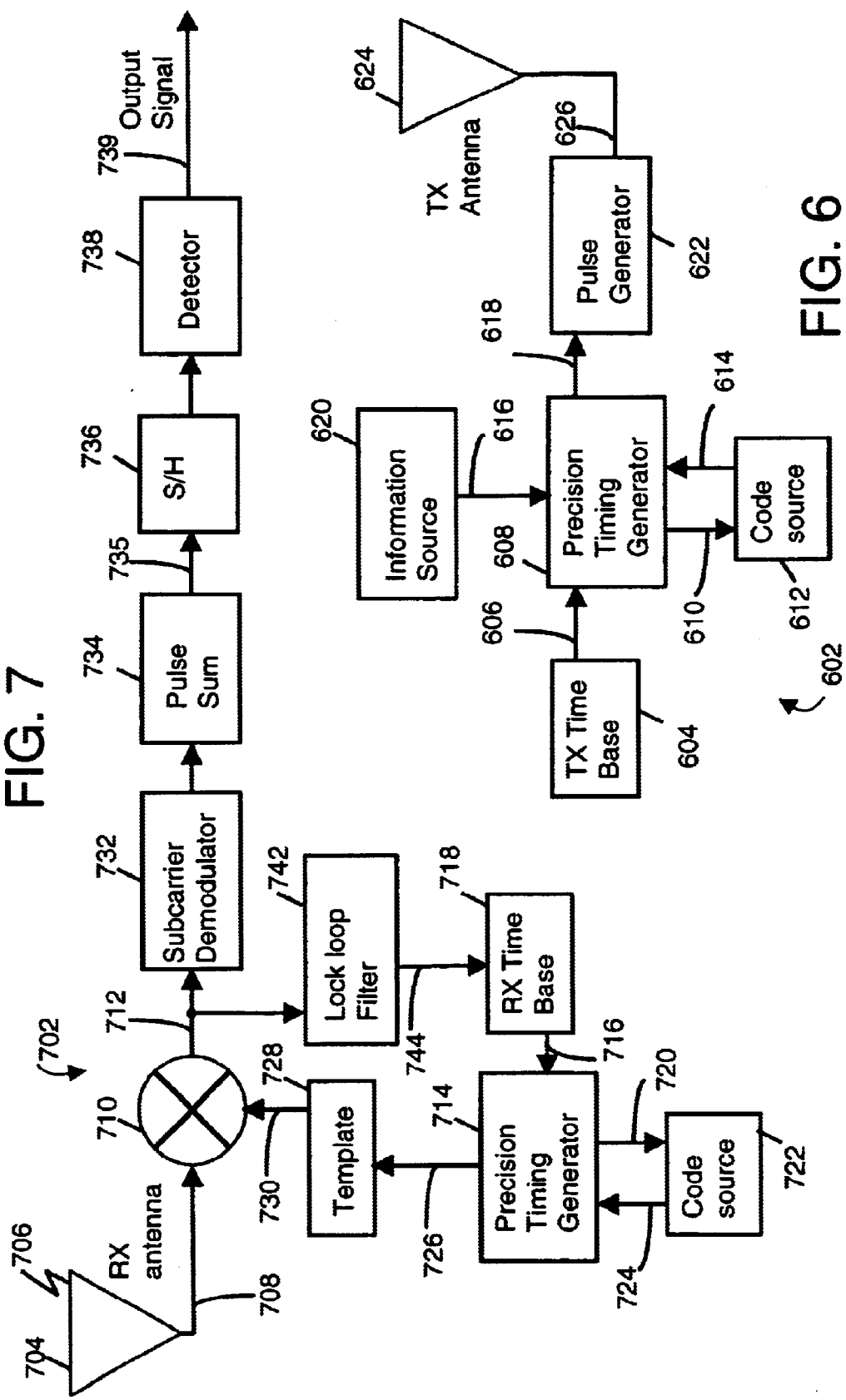

ATLANTA GOLF & COUNTRY CLUB
5205 Peachtree Parkway / Alpharetta, Georgia 30202 / (770) 663-0001
Pro: Rich Hall Tee Times: Summer hours 7:30 to 6:00 call 7 days in advance for tee times. For lessons or analysis of your Scorlink Score Card call RICH HALL, our local Pro. With the information on this card RICH will help you zero in on quick game improving strategies. Also please check our bulletin board for group camp lessons.

| Course Played: | West course | Date: | 07/15/97 | Course Rating: | 71.6 | Scorelink ID#: | 215643 |
|---|---|---|---|---|---|---|---|
| Player: | Gary Weyhausen | PGA# | 8546231 | Yardage: | 6452 | Scorelink Mach#: | 862102 |
| Tees Played: | Blue | Attest: | Dale Crook | Slope: | 134 | Scorelink Card#: | 21536483 |

| Hole | Handicap | Distance | Par | Score | Club Selection | | | | +/- |
|---|---|---|---|---|---|---|---|---|---|
| 1 | 11 | 273 | 4 | 6 | 1W(250) | 8(95) | P | P | +2 |
| 2 | 7 | 531 | 5 | 5 | 1W(275) | 3W(225) | 3(195) | PW(25) | +2 |
| 3 | 17 | 373 | 4 | 6 | 1W(245) | 7(135) | SW | P | +4 |
| 4 | 1 | 197 | 3 | 4 | 3(204) | PW(25) | P | P | +5 |
| 5 | 5 | 325 | 4 | 6 | 1W(265) | 8(110) | P | P | +7 |
| 6 | 13 | 425 | 4 | 4 | 1W(272) | 8(136) | PW | P | +7 |
| 7 | 15 | 346 | 4 | 4 | 3W(232) | 9(96) | PW | P | +7 |
| 8 | 9 | 465 | 5 | 5 | 1W(254) | 3W(205) | 9(85) | P | +7 |
| 9 | 3 | 392 | 4 | 4 | 1W(261) | 6(45) | 7(112) | P | +7 |
| End of 9 holes | | 3261 | 36 | 44 | | | | | |
| 10 | 4 | 195 | 3 | 4 | 4(172) | PW(135) | P | | +8 |
| 11 | 3 | 438 | 4 | 3 | 1W(273) | 5(145) | P | | +7 |
| 12 | 9 | 426 | 4 | 5 | 1W(268) | 6(145) | PW(75) | P | +9 |
| 13 | 12 | 468 | 5 | 5 | 1W(205) | 3(168) | 3(75) | 4(162) | +9 |
| 14 | 18 | 363 | 4 | 4 | 3W(232) | 7(121) | P | P | +10 |
| 15 | 16 | 371 | 4 | 5 | 1W(246) | 5(165) | SW(36) | P | +11 |
| 16 | 10 | 461 | 4 | 4 | 1W(280) | 8(125) | 3W(238) | P | +12 |
| 17 | 1 | 273 | 4 | 5 | 1W(185) | 6(162) | P | P | +13 |
| 18 | 14 | 587 | 5 | 5 | 1W(277) | 3W(230) | SW(42) | P | +13 |
| End of 18 holes | | 3191 | 36 | 41 | | | | | |
| 71.6 | 168 | 6452 | 72 | 85 | Previous Rounds 94; 96; 91; 88; 92; 89 YOUR BEST YET!!! | | | | |

| Club | Used | Hit Fairway | Hit Green | Distance |
|---|---|---|---|---|
| 1 wood | 14 [13] (11) | 10 [9] (7) | | 245 [228] (190) |
| 3 wood | 5 [4] (3) | 3 [2] (1) | | 205 [196] (165) |
| 3 iron | 3 [4] (5) | 2 [2] (1) | | 187 [182] (160) |
| 4 iron | 2 [2] (2) | 1 [1] (1) | 2 [2] (1) | 172 [169] (150) |
| 5 iron | 2 [3] (3) | 2 [1] (1) | 1 [2] (2) | 165 [166] (146) |
| 6 iron | 3 [3] (3) | 2 [2] (1) | | 151 [150] (140) |
| 7 iron | 3 [3] (3) | 1 [2] (1) | | 143 [144] (134) |
| 8 iron | 4 [4] (3) | 2 [2] (2) | 5 [3] (4) | 134 [131] (126) |
| 9 iron | 2 [3] (5) | 2 [2] (2) | 2 [4] (4) | 122 [125] (115) |
| PW | 7 [6] (7) | 5 [5] (3) | 5 [4] (3) | 91 [92] (84) |
| SW | 2 [3] (2) | 2 [2] (1) | | 68 [64] (55) |
| Putter | 37 [40] (46) | | | |
| Total | 85 | | | |

Hazards & Penalties

Penalty: Hole 17 2-strokes

Strengths

Long Accurate drives 8 iron and SW

Legend: 1W = 1 Wood
W = Water RF = Ruff
LB = Lost Balls P-1=1
Stroke Penalty; P-2=2
Stroke Penalty; SW =
Sand Wedge; OB = Out
Of Bounds; OB-1 = Out
Of Bounds 1 Stroke
Penalty; [Your Previous Average] (Course Average)

☐ Current Round
  Tour Average this round
  Course Average

Gary Weyhansen          Pin Point I.D. # 215643
07/15/97
Course: Atlanta Golf & Country Club    For more analysis check
Club Distance Chart:                    our web site tomorrow.
                                        www.PinTech.net
Woods:
1: 245    2:        3: 205    4:        5:        6:        7:
Irons:
1:        2:        3: 187    4: 172    5: 165    6: 151    7: 139
8: 134    9: 122    PW: 91    SW: 38
Other:                        Last Score: 85

NOTE: Our Pro. RICH HALL is putting on a 2 hour camp on 11/6/97 starting at 9am concentrating just on putting. It's designed to trim 3 to 4 strokes off your score immediately. There will be hands on personal help and instruction besides tips on reading greens and techniques. Our camps fill up fast, so call our front desk for reservations @ 770-623-0000

Check out your Score and posted on our Internet web site. You will be compared to other golfers at this course for three days. See www.PinTech.net You'll find our internet site fun and informative.

FIG. 12

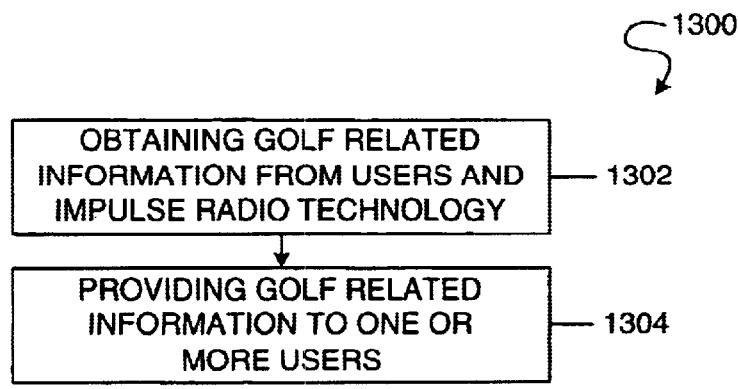
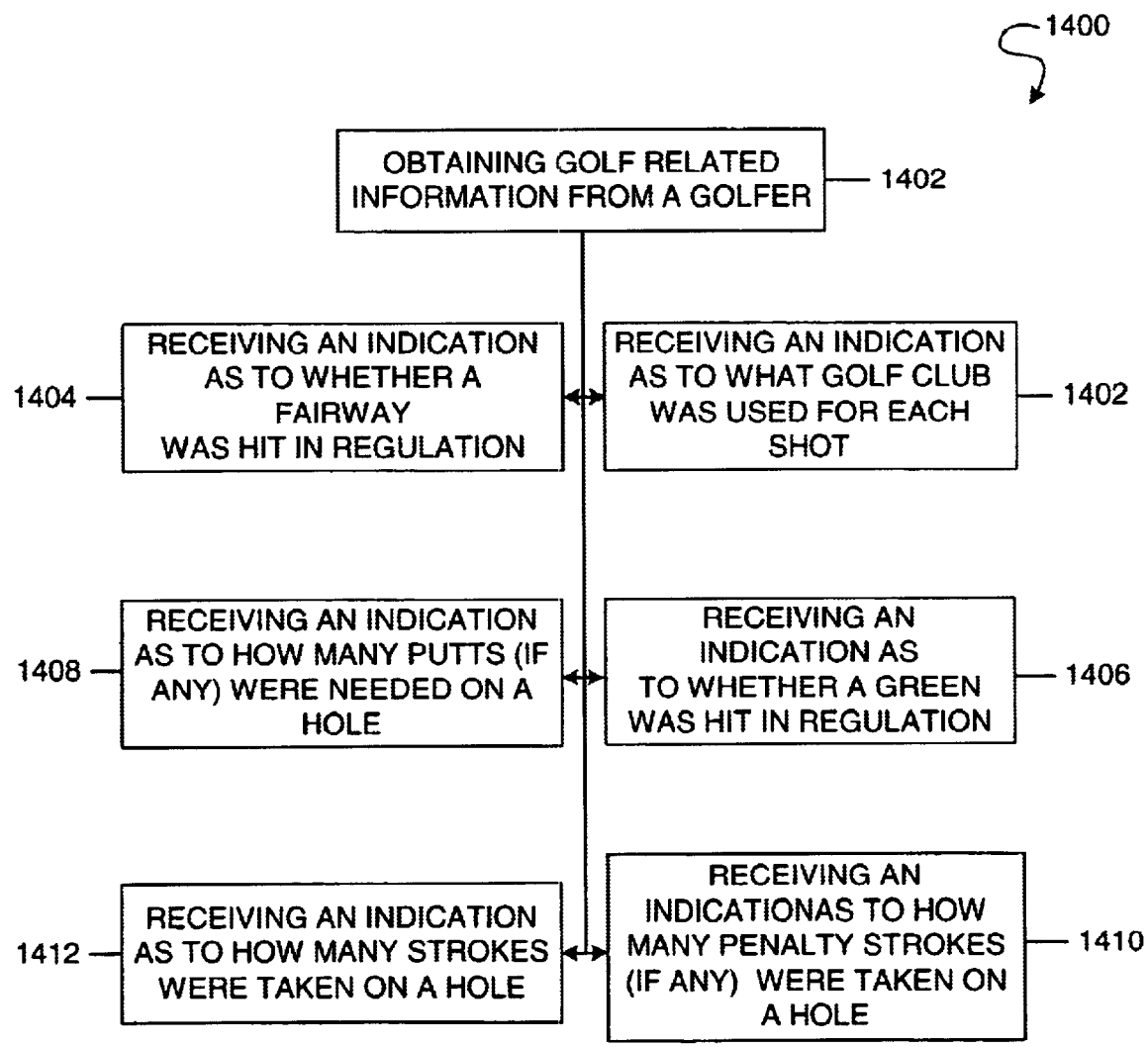

METHOD AND APPARATUS FOR MANAGING GOLF RELATED INFORMATION OBTAINED IN PART BY USING IMPULSE RADIO TECHNOLOGY

BACKGROUND OF THE INVENTION

1. Field of the Invention

The present invention relates in general to golfing and, in particular, to a method and apparatus capable of managing golf related information that was obtained in: part by using impulse radio technology.

2. Description of Related Art

A relatively small number of golf courses today use some sort of positioning system that provides a golfer with a rough estimate as to the distance a golf ball is located from a golf pin. Unfortunately, the traditional positioning systems do not provide the golfer with much more information other than this rough estimate as to how far the golf ball is located from the golf pin. Of course, the golfer would like additional information while playing golf that the traditional positioning systems are unable to provide.

A vast majority of traditional positioning systems utilize Global Positioning System (GPS) based technology. Unfortunately, due to the physical constraints and power requirements of GPS based technology most of the GPS units must be mounted on a golf cart instead of being hand carried by the golfer. Thus, when the golfer is not allowed to drive the golf cart next to the golf ball then the already rough approximation of the distance from the golf ball to the golf pin is made even less accurate. Because, the golfer must now add or subtract the distance the golf cart is away from the golf ball to or from the distance indicated by the traditional positioning system.

One of the physical constraints of GPS based technology is the relatively large size of GPS units which often include GPS electronics, memory, logic, a R/F transceiver and a battery. Today InFOREtech and VXT are two companies that are marketing mobile GPS units for use in golf. However, neither of these mobile GPS units are small enough to be conveniently carried by a golfer. In addition, these mobile GPS units only provide the golfer with a, rough approximation of the distance between the GPS unit and the golf pin or green.

Moreover, the golf cart-mounted GPS units are basically an all or nothing proposition. For instance, if the golf cart breaks down the GPS unit is out of commission, and if the GPS unit breaks down the golf course is not likely to take the golf cart out of commission so the golfer will not be able to use an operable GPS unit. In addition, the golf cart-mounted GPS units only work on golf courses that use golf carts. Thus, the golf cart-mounted GPS units offer little flexibility to the golfers and the golf courses.

Another problem with GPS units is that they suffer from certain well known inaccuracies attributable to atmospheric alterations and an inability to communicate with GPS satellites through trees and buildings. Selective authority was a government—controlled way of making GPS based technology inaccurate for defense purposes. Even though government controlled selective authority has been eliminated, GPS has inherent inaccuracies which must be offset, for use on a golf course, with a correction signal received from a base station located on the golf course or from another satellite. However, GPS units that receive this correction signal still generate an inaccurate measurement that may be off 5 or more meters and the golf pin may be off the same thus doubling the potential for providing the golfer with an inaccurate distance. To date there is nothing that can be done to compensate for atmospheric alterations which are an inherent problem with GPS based technology. Moreover, GPS based technology suffers from a highly unreliable infrastructure because GPS units require that at least two separate signals be received at all times to remain operable.

Yet another problem with GPS units is that they provide a very limited amount of information to the golfer and only the golfer. The information generally provided to the golfer is a rough approximation of the distance between the golf ball and the golf pin, which is usually of interest to the golfer and of no interest to the golf course or anybody else for that matter.

Accordingly, there is a need for a method, system and apparatus capable of obtaining and providing a variety of golf related information to a wide range of users including, for example, golfers, golf trainers, golf businesses and golf course personnel. In addition, there is also a need for an apparatus having the aforementioned capabilities that can also be packaged in a handheld unit that is easily carried out on a golf course by a golfer. These needs and other needs are solved by the method, system, and apparatus of the present invention.

BRIEF DESCRIPTION OF THE INVENTION

The present invention includes an apparatus, system and method all of which overcome the shortcomings of traditional positioning systems by utilizing impulse radio technology to obtain golf related information that can be used by one or more users. For instance, golfers may use the golf related information to help them make informed decisions while playing golf on the golf course. And, golf trainers can use the golf related information associated with a golfer to help that golfer to improve their game. In addition, golf course personnel can use the golf related information to help manage and increase the profitability of the golf course. Moreover, golf businesses can use the golf related information to help them verify the accuracy of advertising claims made by their competitors. These are just some of the uses and advantages of the present invention.

BRIEF DESCRIPTION OF THE DRAWINGS

A more complete understanding of the present invention may be had by reference to the following detailed description when taken in conjunction with the accompanying drawings wherein:

FIG. 2A illustrates a pulse train comprising pulses as in FIG. 1A.

FIG. 2B illustrates the frequency domain amplitude of the waveform of FIG. 2A.

FIG. 3 illustrates the frequency domain amplitude of a sequence of time coded pulses.

FIG. 6 illustrates a representative impulse radio transmitter functional diagram.

FIG. 7 illustrates a representative impulse radio receiver functional diagram.

FIG. 12 is a diagram illustrating the type of score card that can be generated by a base station of the system of FIG. 9.

FIG. 13 is a flowchart illustrating the basic steps of an exemplary method for obtaining and managing golf related information in accordance with the present invention.

FIG. 14 is a flowchart illustrating in greater detail an obtaining step of the method shown in FIG. 13, wherein a user of the golf related information is a golfer.

DETAILED DESCRIPTION OF THE INVENTION

Figure 1B:
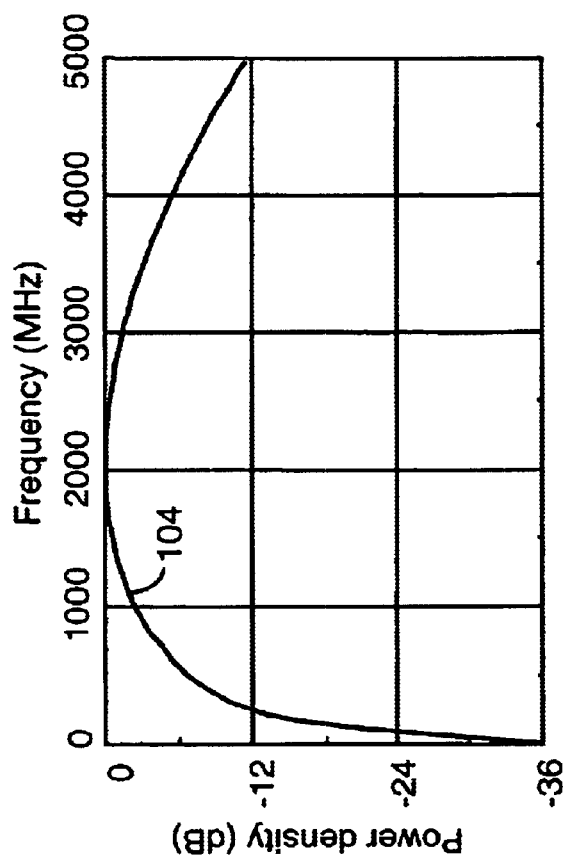
FIG. 1B illustrates the frequency domain amplitude of the Gaussian Monocycle of FIG. 1A.

The description of the invention is presented in sections according to the following table of contents:

Table of Contents
I. Brief Overview of the Invention
II. Impulse Radio Basics
  II.1. Waveforms
  II.2. Pulse Trains
  II.3. Coding for Energy Smoothing and Channelization
  II.4. Modulation
  II.5. Reception and Demodulation
  II.6. Interference Resistance
  II.7. Processing Gain
  II.8. Capacity
  II.9. Multipath and Propagation
  II.10. Distance Measurement and Position Location
  II.11. Exemplary Transmitter Implementation
  II.12. Exemplary Receiver Implementation
III. Impulse Radio as used in the Present Invention

I. Brief Overview of the Invention

The present invention includes a system, apparatus and method each of which is capable of managing a variety of golf related information some of which was obtained by using impulse radio technology. The use of impulse radio technology to obtain golf related information is a significant improvement over traditional GPS positioning system. This significant improvement is attributable, in part, to the type and detail of golf related information now obtainable with the aid of an emerging, revolutionary ultra wideband technology (UWB) called impulse radio communication technology (also known as impulse radio).

Impulse radio was first fully described in a series of patents, including U.S. Pat. No. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. No. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

To better describe the present invention a brief description about impulse radio technology is provided before describing the present invention.

II. Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

II.1. Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where,
$\sigma$ is a time scaling parameter,
t is time,
$f_{mono}$ (t) is the waveform voltage, and
e is the natural logarithm base.

Figure 1A:
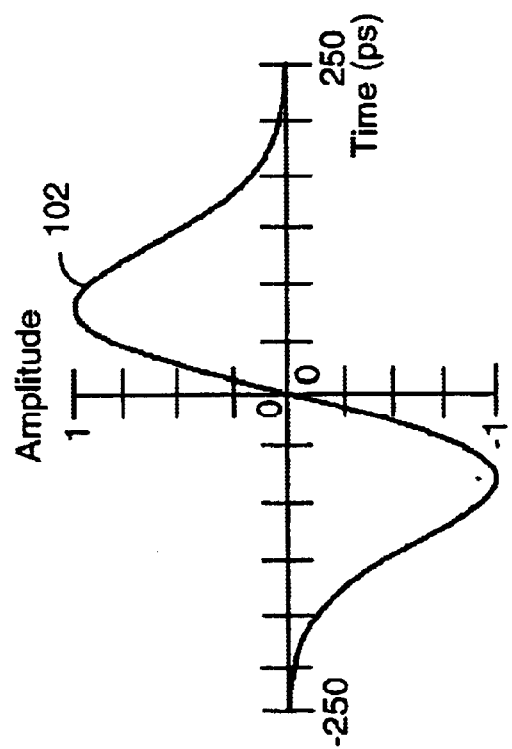
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{\frac{3}{2}} \sigma f e^{-2(\pi \sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

II.2. Pulse Trains

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

II.3. Coding for Energy Smoothing and Channelization

For high pulse rate systems, it may be necessary to more finely spread the spectrum than is achieved by producing comb lines. This may be done by pseudo-randomly positioning each pulse relative to its nominal position.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

II.4. Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

II.5. Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

II.6. Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
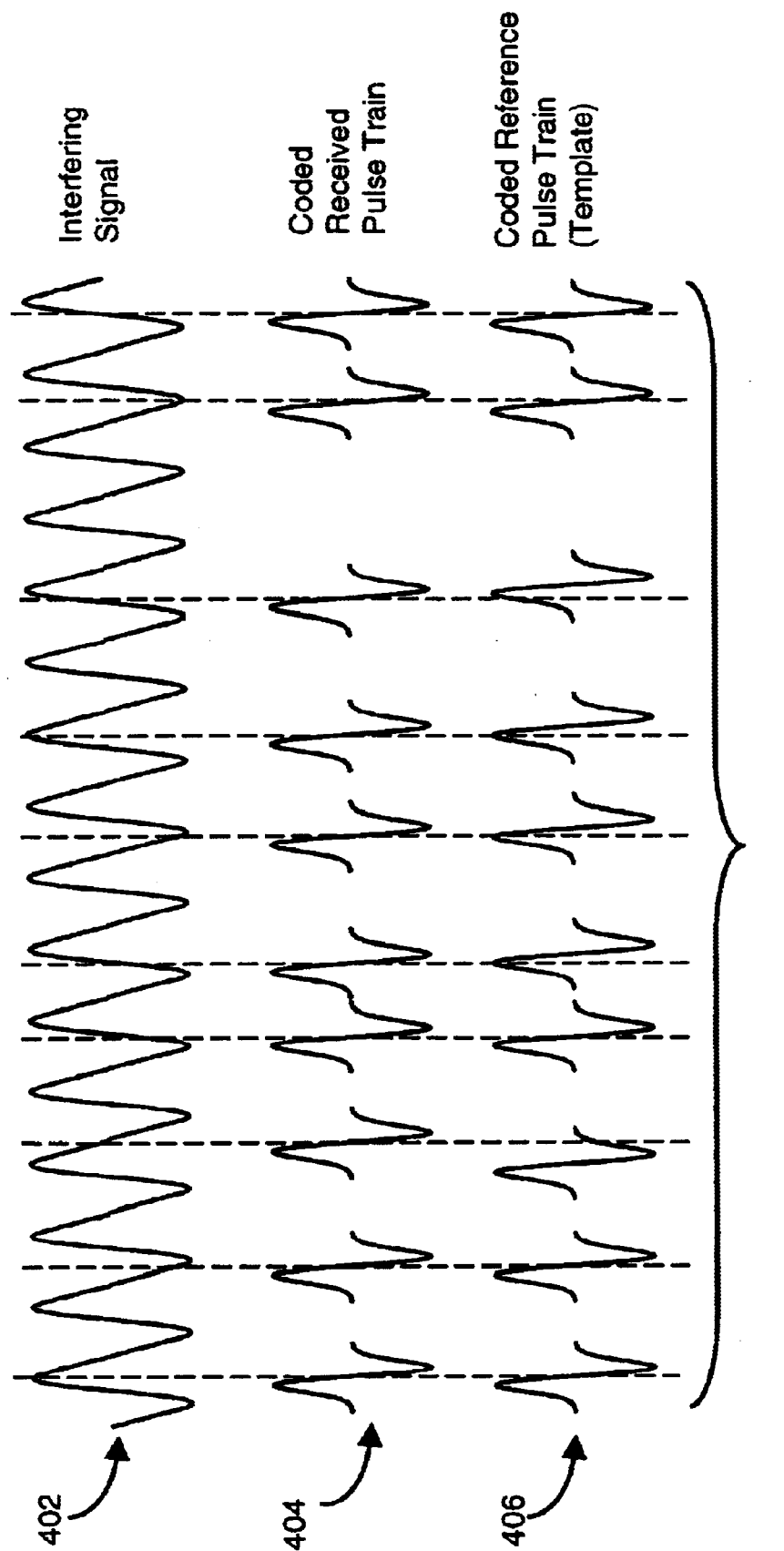
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

II.7. Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

II.8. Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

II.9. Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
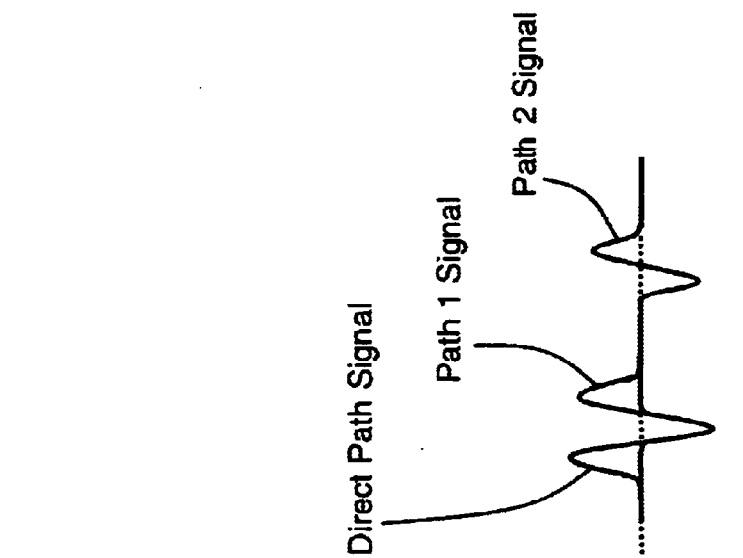
FIG. 5B illustrates exemplary multipath signals in the time domain.
Figure 5A:
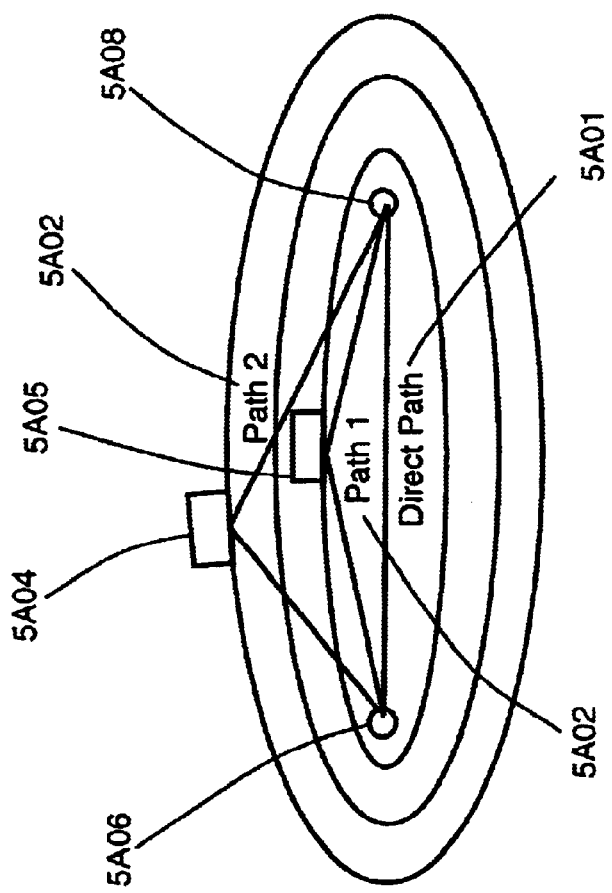
FIG. 5A illustrates a typical geometrical configuration giving rise to multipath received signals.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

II.10. Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The assignees of the present invention have built systems that have shown the potential for centimeter distance resolution, which is equivalent to about 30 ps of time transfer resolution. See, for example, commonly owned, U.S. Pat. No. 6,133,876, titled "Ultrawide-Band Position Determination System and Method", and U.S. Pat. No. 6,111,536, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. Pat. No. 6,300,903, titled, "System and Method for Person or Object Position Location Utilizing Impulse Radio."

II.11. Exemplary Transmitter Implementation

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

II.12. Exemplary Receiver Implementation

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712.

The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned U.S. Pat. No. 6,421,389, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

Figure 8A:
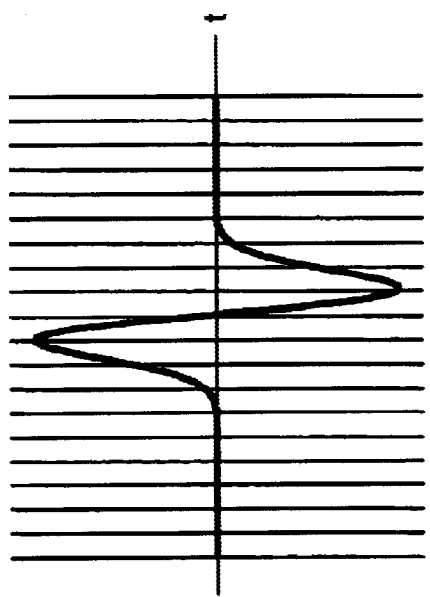
FIG. 8A illustrates a representative received pulse signal at the input to the correlator.
Figure 8B:
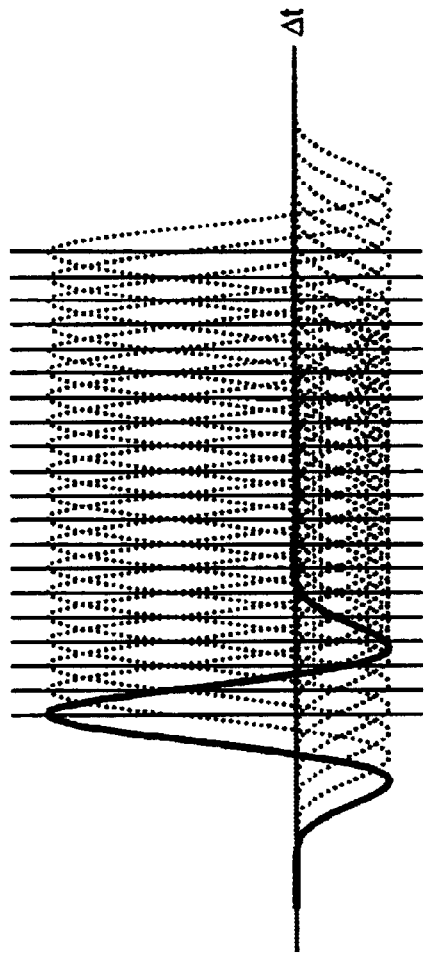
FIG. 8B illustrates a sequence of representative impulse signals in the correlation process.
Figure 8C:
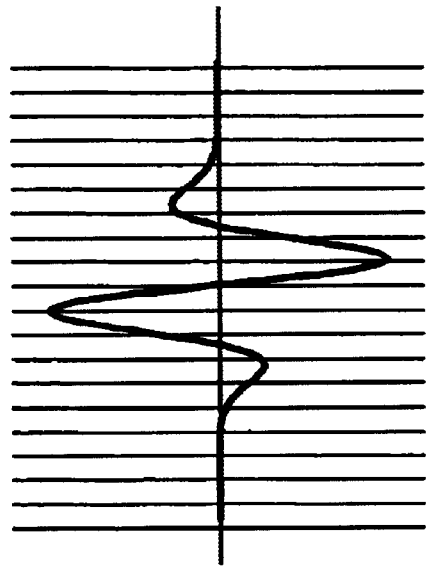
FIG. 8C illustrates the output of the correlator for each of the time offsets of FIG. 8B.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

III. Impulse Radio as Used in the Present Invention

Referring to FIGS. 9–21, there are disclosed different embodiments of an exemplary system, preferred method and exemplary apparatus in accordance with the present invention.

Although the present invention is described as using impulse radio technology, it should be understood that the present invention can be used with any type of ultra wideband technology, but is especially suited for use with time-modulated ultra wideband technology. Accordingly, the exemplary system, preferred method and exemplary apparatus should not be construed in a limited manner.

Figure 9:
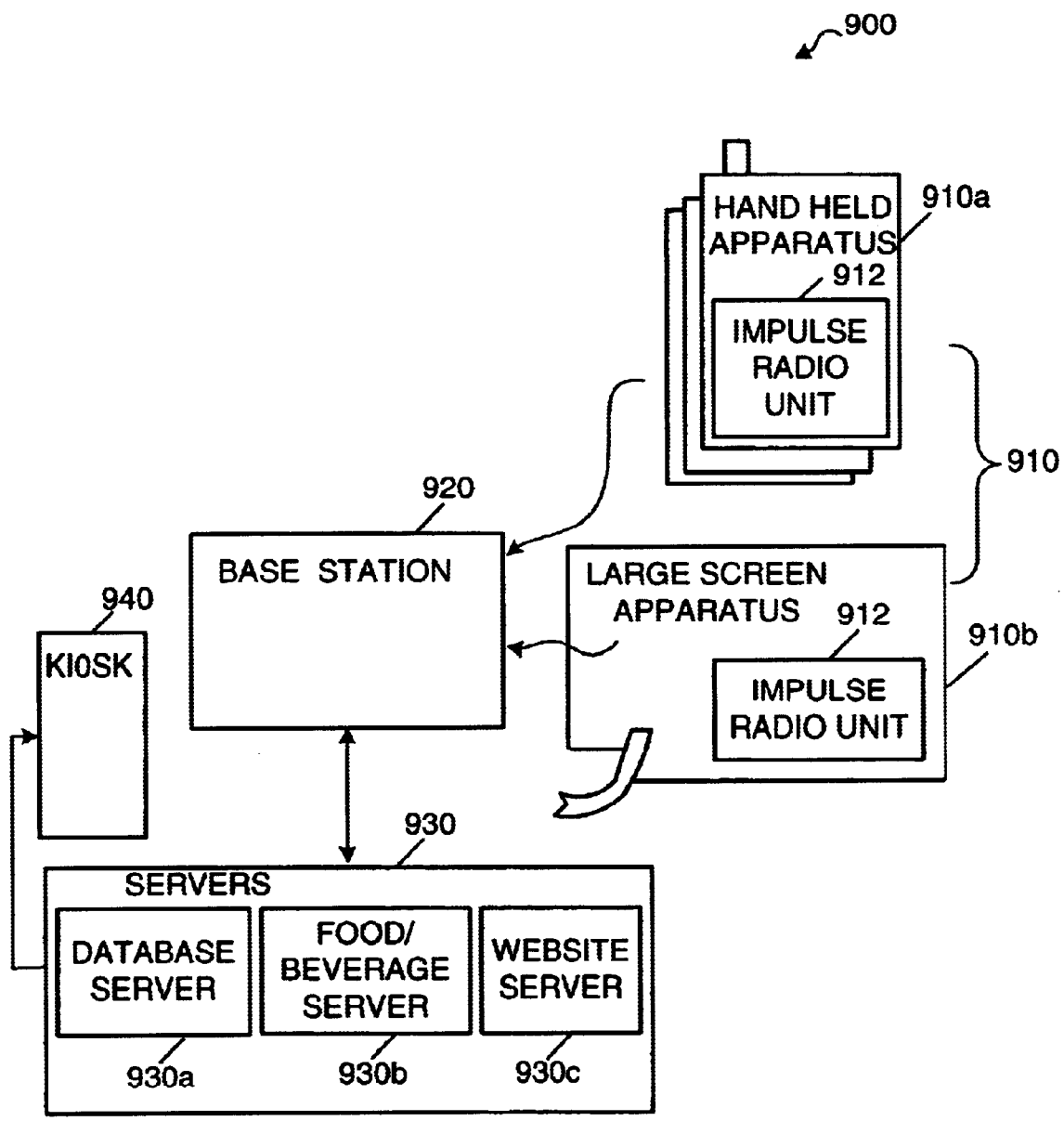
FIG. 9 is a block diagram illustrating the basic components of a system of the present invention.

Referring to FIG. 9, there is a block diagram illustrating the basic components of an exemplary system 900 of the present invention. Basically, the system 900 includes at least one apparatus 910 (e.g., handheld apparatus 910a, large screen apparatus 910a), a base station 920 and at least one server 930 (e.g., database server 930a, food and beverage server 930b, and web site server 930c) and a kiosk 940 (optional) all of which are capable of providing multiple users with a wide range of golf related information. The golf related information is obtained not only from users (e.g., golfers, golf course employees) but also from impulse radio units including impulse radio transmitters and/or impulse radio receivers, see sections II.11. and II.12. Users of the golf related information include, for example, golfers, golf trainers, golf course personnel and golf businesses each of which is interested in obtaining different types of golf related information. A detailed description about the basic components of the system 900 is deferred pending a brief discussion about how different users can utilize the system 900.

For example, when the user is a golfer then that golfer can provide the apparatus 910 with golf related information such as where a golf ball is currently located by simply pressing a "mark-the-ball" button on the apparatus. Thereafter, the apparatus 910 including an impulse radio unit 912 can communicate with another impulse radio unit located in or near a golf pin and then determine and inform the golfer as to how far the golf ball is located from the golf pin.

A group of golfers may use one or more apparatuses 910 to keep their scores in real-time and display them in the form of a Leader Board. For instance, the golfers can program the apparatus 910 to track their scores according to the rules of their own game where hole 1 is worth 2 points for longest drive, hole 2 is worth 3 points for closest to the pin, hole 3 is worth 2 points for longest putt, overall 3 points for most fairways hit, overall 4 points for most greens hit in regulation, etc. The apparatus 910 is capable of calculating and displaying the scores and points of each golfer as they are playing golf.

Another user of the golf related information can be a golf trainer. For example, the golf trainer can review the golf related information associated with a particular golfer that was obtained during a round of golf to help identify any "weak" areas of that golfer's game. The golf related information that would be of interest to the golf trainer can include, for example, the golf club number and type used for each golf shoot during a round, how far the golf ball was hit and how accurate each golf shoot was hit during the round. Thus, the golf trainer that is provided with precise data about a particular golfer can quickly identify what type of lessons would most likely help improve the game of that golfer.

Yet another user of the golf related information can be golf course personnel. For example, the golf course personnel could use the golf related information to help manage and increase the profitability of the golf course. The golf related information that would be of interest to golf course personnel could include an indication where each golfer is located on the golf course at any given time. Knowing the location of each golfer and being able to calculate their speed of play can help the golf course personnel identify "slow" golfers. The golf course personnel can then ask these "slow" golfers to speed-up their play which would enable additional: golfers to be on the golf course at any one time which would increase the profitability of the golf course.

Still yet another user of the golf related information could be a business associated with the manufacturing, distributing and/or marketing of golf equipment. For example, the golf business could use the golf related information to review data such as what number, type and make of clubs were used by golfer(s) to determine how the clubs actually performed for the golfer(s). In addition, the golf business can use the golf related information to verify the accuracy of advertising claims made by their competitors. It should be understood that the there are many other types of users that can utilize the golf related information that was obtained and managed in accordance with the present invention.

How impulse radio equipment can be used to obtain some of the golf related information is described in greater detail below with respect to FIG. 10. In addition, a detailed description as to what type of golf related information can be obtained from a user (e.g., golfer) and what type of golf related information can be provided to different users and how each of them can use this information is described below with respect to FIGS. 10–18.

Figure 10:
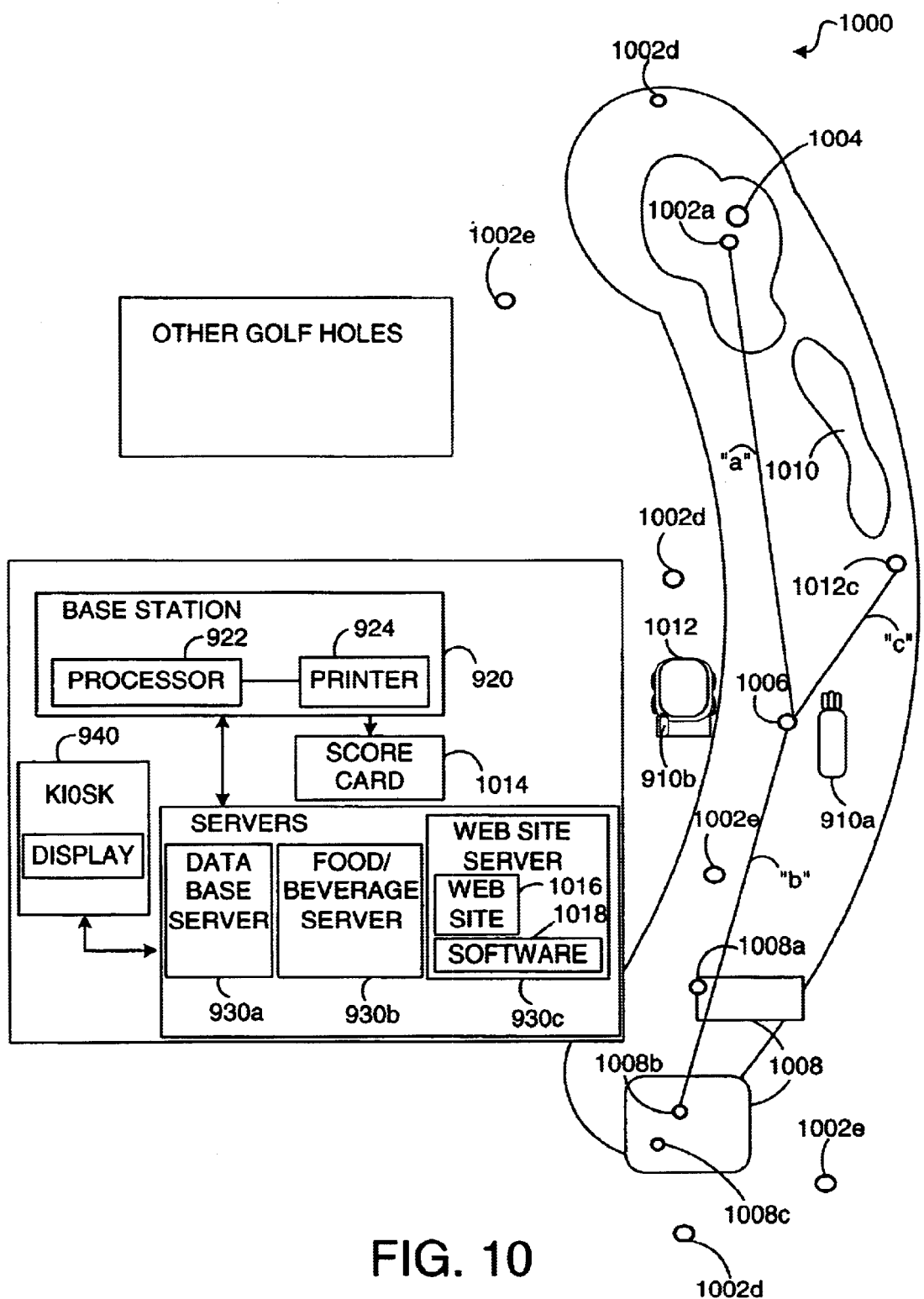
FIG. 10 is a diagram illustrating an exemplary golf course incorporating the system of FIG. 9.

Referring to FIG. 10, there is a diagram illustrating an exemplary golf course 1000 adapted to utilize the system 900 of FIG. 9. The golf course 1000 (shown with one golf hole and a clubhouse) includes a series of impulse radio units 1002 located at various positions throughout the golf course. Each impulse radio unit 1002 is capable of interacting with the impulse radio unit 912 located within apparatus 910 (only two shown). The impulse radio units 1002 and 912 communicate with one another using impulse radio technology that was described above with respect to FIGS. 1–8.

As illustrated, the golf course 1000 has an impulse radio unit 1002a located at or near a golf pin 1004 (only one shown) The impulse radio unit 1002a communicates with the apparatus 910 which, in turn, completes a distance calculation and informs the golfer as to what the distance "a" is between a golf ball 1006 and the golf pin 1004. To accomplish this task, the golfer would have normally had to interact with and inform the apparatus 910 as to the current position of the golf ball 1006 which is shown next to the apparatus. This interaction between the golfer and apparatus 910 could be done in any fashion such as, for example, depressing a "mark-the-ball" button on the apparatus 910 or using speech recognition technology. Since, the apparatus 910 can be handheld by the golfer then the current position of the apparatus and the golf ball 1006 are usually the same.

The golf course 1000 also has at least one impulse radio unit 1002b located at or near a tee-off area 1008. The impulse radio unit 1002b communicates with the apparatus 910 which, in turn, completes a distance calculation and informs the golfer as to what the distance "b" is between the golf ball 1006 and the tee-off area 1008. To accomplish this task, the golfer would have normally had to interact with and inform the apparatus 910 as to the current position of the golf ball 1006. This interaction between the golfer and apparatus 910 could be done in any fashion such as, for example, depressing the "mark-the-ball" button on apparatus 910 or using speech recognition technology. Of course, if the golfer has already interacted with apparatus 910 and obtained distance "a" then the apparatus could automatically calculate and provide distance "b" to the golfer.

To provide even more specific golf related information to the golfer, there may be one impulse radio unit 1002b located at. or near a women's tee 1008a, a men's tee 1008b and a championship tee 1008c located in the tee-off area 1108. The golfer may inform the apparatus 910 that he/she is playing from a particular tee 1008a, 1008b or 1008c which would enable the apparatus to determine the distance "b" between the golf ball 1006 and the impulse radio unit 1002b associated with that particular tee 1008a, 1008b or 1008c.

In a similar manner, the apparatus 910 can provide the golfer with an indication as to how far the golfer hit the golf ball, which was not hit from the tee-off area 1008. To calculate this distance, the apparatus 910 would need to remember the previous location of the golf ball 1006 and compare that information to the current location of the golf ball 1006.

As shown, the golf course 1000 has an impulse radio unit 1002c located in or near a hazard 1010 which can include, for example, water, sand, rock(s) or tree(s). In the same manner as described above, the impulse radio unit 1002c communicates with the apparatus 910 which, in turn, completes a distance calculation and informs the golfer as to what the distance "c" is between the golf ball 1006 and the hazard 1010. All of these distance calculations can occur in less than a second and can have an accuracy of +/−2 centimeters to 1 inch.

In addition, there may be one or more impulse radio units 1002d (only three shown) located along the perimeter of a golf hole which together can function like a radar and provide the apparatus 910 with golf related information indicating the trajectory that the golf ball 1006 traveled for a particular shot and/or the position at which the golf ball came to rest after being hit by the golfer. The apparatus 910 can store this information and display it for the golfer or any other user.

The golf course 1000 may also have a plurality of beacon impulse radio units 1002e (only three shown) located at known positions throughout the golf course. The apparatus 910 can interact with one or more of the beacon impulse radio units 1002e to determine the position of the apparatus. Basically, the beacon impulse radio units 1002e interact with and provide the apparatus 910 with their reference points to enable the apparatus to triangulate and determine its position on the golf course 1000. In addition, the beacon impulse radio units 1002e can also function as relays to improve the robustness of communication on the golf course 1000. Each impulse radio unit 912, 1002a, 1002b, 1002c and 1002d can be powered in a variety of ways including, for example, battery power and solar power.

The golfer can also interact with and input a variety of other golf related information into the apparatus 910. For example, the golfer may provide the apparatus 910 with information such as what golf club was used for a particular shot, how many and which fairways were hit in regulation, how many and which greens were hit in regulation, and how many putts or penalties were taken on a particular golf hole. The apparatus 910 can store the golf related information provided by the golfer and relate this information with the golf related information that was obtained during the round of golf using the communications between the different impulse radio units 912, 1002a, 1002b, 1002c and 1002d.

The apparatus 910 may have many different forms including, for example, a handheld apparatus 910a, or a large screen apparatus 910b than can be mounted on a golf cart or utility cart 1012. Each apparatus 910 has the capability to communicate with other apparatuses 910, thus enabling a golfer to communicate with other golfers or golf course personnel while playing on the golf course.

Figure 11A:
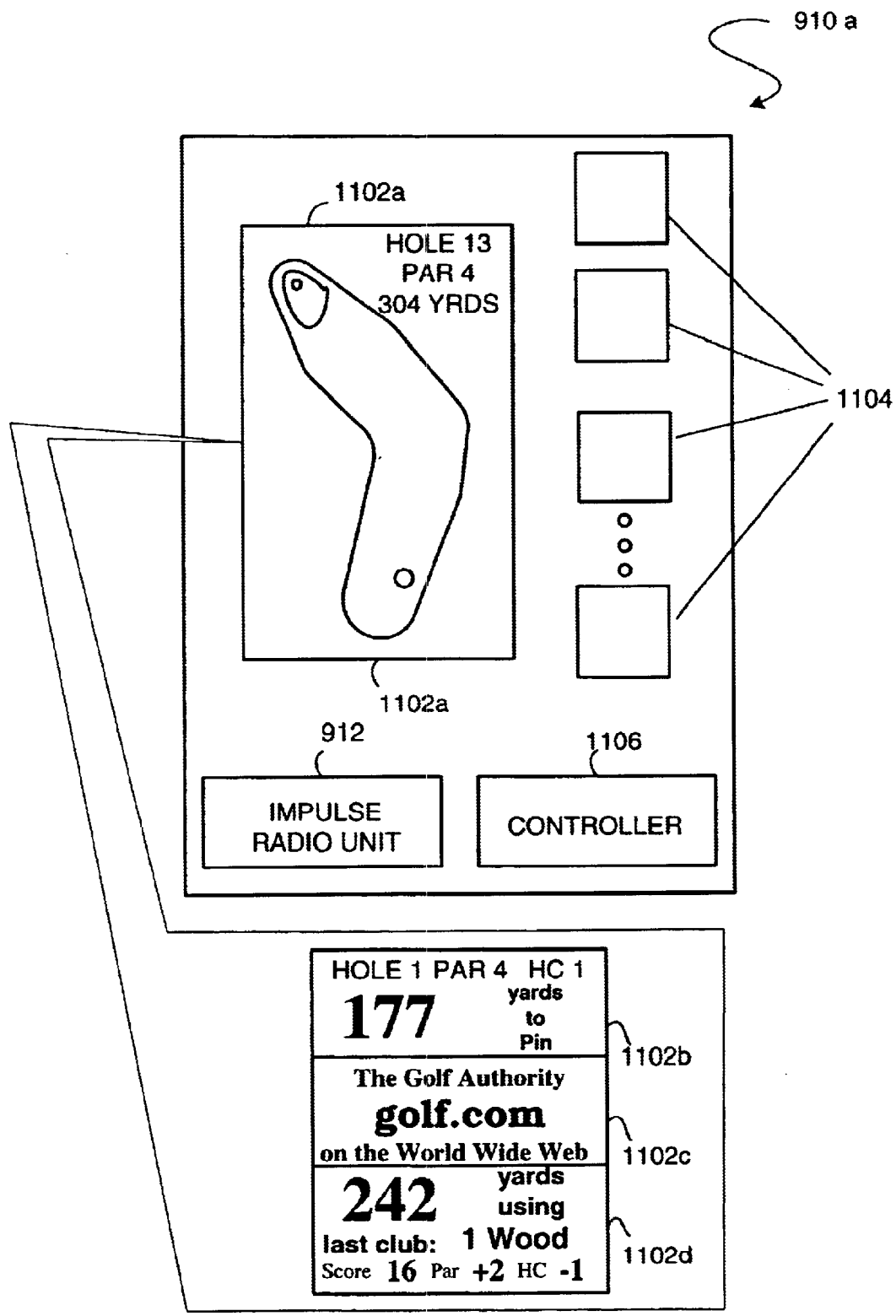
FIG. 11A is a diagram illustrating in greater detail an exemplary handheld apparatus of the system of FIG. 9.

Referring to FIG. 11A, there is illustrated in greater detail an exemplary handheld apparatus 910a. The handheld apparatus 910a also known as a caddy unit includes the impulse radio unit 912, a display 1102, a plurality of buttons 1104 (e.g., information, scroll, stroke, putt and penalty buttons) and a controller 1106. The impulse radio unit 912 is capable of performing many different functions including, for example, distance calculations, position calculations, radar operations and communication operations.

The handheld apparatus 910a can be programmed to illustrate a wide range of golf related information to a user. For example, the handheld apparatus 910a can be programmed such that the display. 1102 simply shows in screen 1102a the layout of one of the golf holes. Or, the handheld apparatus 910a can be programmed to divide the display 1102 into a plurality of screens 1102b, 1102c and 1102d. As illustrated, screen 1102b could illustrate golf related information such as the distance from the golf ball 1006 to the golf pin 1004 (e.g., distance "a"). And, screen 1102c could illustrate golf related information such as advertisements (as shown), weather reports or a copy of the menu. Lastly screen 1102d could illustrate golf related information such as the distance the golf ball 1006 was previously hit by the golfer (e.g., distance "b"). Of course, the apparatus 910 can include many other types of displays or screens that can provide a golfer with a wide-range of golf related information.

In general, the handheld apparatus 910a functions as a non-intrusive tracking and data collection device that can provide benefits to three primary groups of users which include golf course personnel, golf trainers and golfers. The golf course personnel can utilize the handheld apparatus 910a to track assets such as carts, mowers, employees or golfers. From this ability to track these assets, golf course personnel can use back-end software to better manage and utilize their primary fixed asset which is the golf course. For instance, the handheld apparatus 910a is also capable of helping the golf course personnel to:

Add foursomes into openings at the golf course.

Track and correct slow play.

Track and correct areas of the golf course that slows play and play back movement.

Track employees and play back movement.

Track major assets such as tractors and mowers.

Speed-up the pace of play by eliminating the need for the golfer to search for distance markers.

The golf trainer can utilize the handheld unit 910a as a dynamic tool to drive revenue into the golf trainer's department. For instance, the handheld apparatus 910a is capable of helping the golf trainer to:

Learn about the game of a particular golfer in a short amount of time.

Quickly target and analyze a weakness in the game of a particular golfer.

Increase the number of lessons and clinics at the golf course. For instance, golfers that have a predetermined number of putts per round are provided with an advertisement about the next putting clinic on their score card (see FIG. 12).

Increase equipment sales at the golf course. For instance, the handheld apparatus 910 can accurately show if a new titanium driver actually does increase the distance that a golfer hits a drive.

Meet and train more golfers, because the golf trainer can learn about the game of a golfer without having to spend time actually playing golf with that golfer.

Promote a positive atmosphere of competition between golfers and the golf trainer by generating reports, such as long drive, closest to the hole, etc. which, in turn, provides a sense of comradeship between golfers and the golf trainer.

Align golfers of like abilities to play and meet other golfers.

The golfer can utilize the handheld unit 910a as a dynamic tool to improve their golf game. For instance, the handheld apparatus 910a is capable of helping the golfer to:

Track their score and provide the distance hit on each shot, penalties, putts, and fairways and greens hit in regulation.

Increase the speed of play of a golfer.

Determine distance to any hazards or points of interest such as landing areas.

Determine distance to golf pin.

Associate each shot with a club. This functionality is for the active user that wants to know how far he/she hits each club.

Generate a score card 1014 displaying the data in a logical order so the golfer can get a clear picture of their game.

Compare their golf related data against other players at that course during that day.

Retain their golf related data and compare it from round to round.

Calculate handicaps and adjust scores.

The handheld apparatus 910a is designed to be easy and intuitive for the golfer to operate. The process of entering golf related data into the handheld apparatus 910a is such that the interaction flows with the normal processes of the game and has been simplified to the use of two or three buttons for most golfers. Golfers can be characterized as one of the following:

A passive user or one that simply uses the handheld apparatus 910a to view the display to obtain basic distance information. In other words, the passive user uses the handheld apparatus 910a for distance information and does not interact with or record golf related data.

A semi-passive user or one that simply uses one button to interact with the handheld apparatus 910a. The semi-passive user can mark the position of the golf ball by pressing a stroke button, a toggle switch then adds or subtracts a stroke. In this semi-passive mode, the interaction between the golfer and handheld apparatus 910a is intuitive and simple because it directly follows the normal flow of the game. The handheld apparatus 910a is flexible for mistakes and errors, it doesn't matter if a golfer forgets to press a button since he/she can simply press the button later.

An active user or one that not only presses the stroke button but also wants to attach a club with a stroke, (i.e. 6 iron). For instance, the handheld apparatus 910a can offer a club selection based on historical data. If the golfer elects to use the club suggested then no buttons need to be pushed. And, if the golfer used a different club then a simple scroll button can be used to indicate to the handheld apparatus 910a which club was used by the golfer.

Figure 11B:
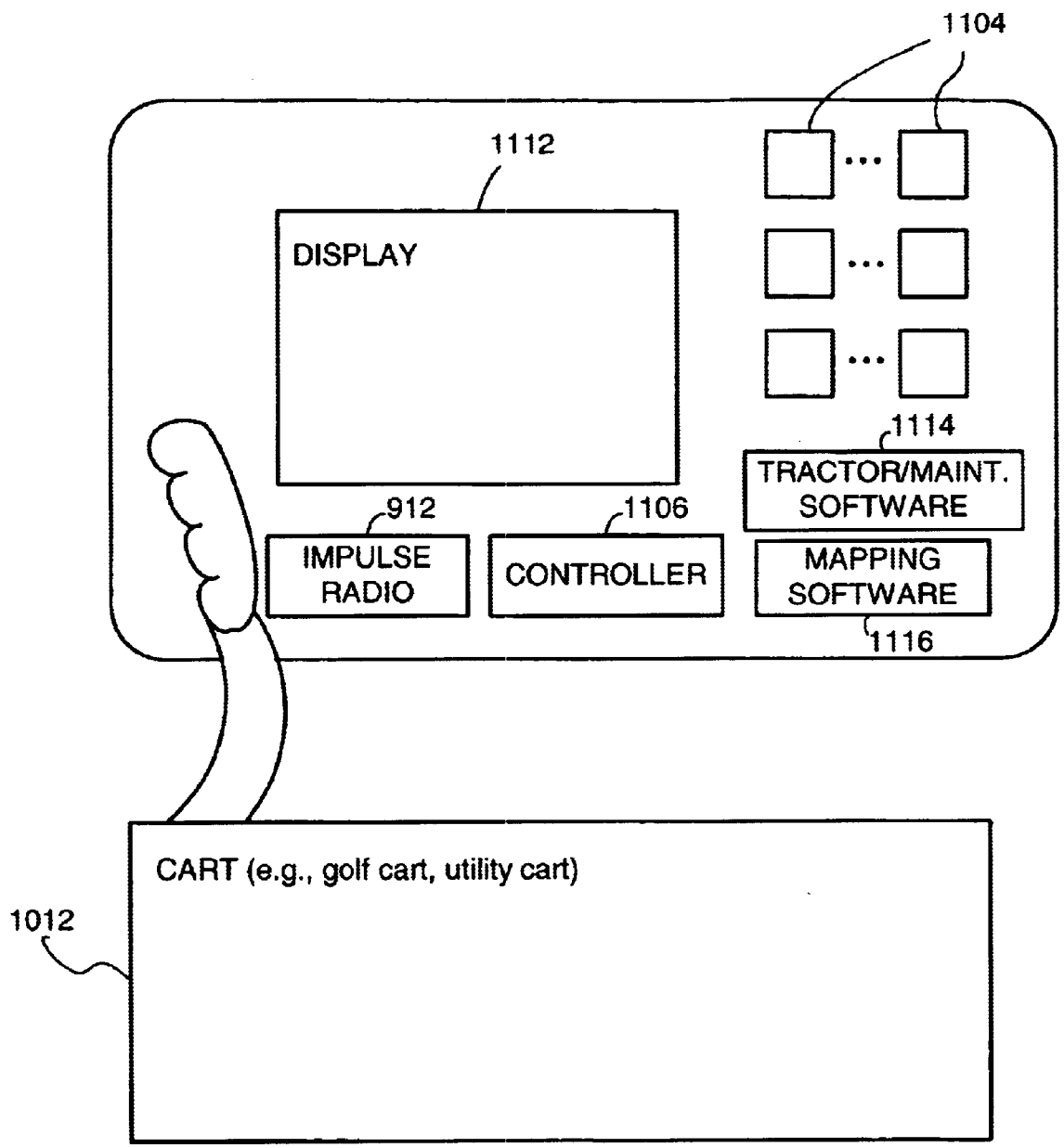
FIG. 11B is a diagram illustrating in greater detail an exemplary large screen apparatus of the system of FIG. 9.

Referring to FIG. 11B, there is illustrated in greater detail an exemplary large screen apparatus 910b that can be mounted on a piece of equipment including, for example, a golf cart or utility cart 1012. The apparatus 910b also known as a large screen mounted unit has the same capabilities as the handheld apparatus 910a with the differences being in the size of the display 1112 and the amount of software that can be stored therein (e.g., tractor/grounds maintenance software 1114 and course mapping software 1116).

The large screen apparatus 910b is also capable of communicating with and displaying much of the golf related data collected by the handheld apparatus 910a. In addition, the large screen apparatus 910b provides the golfer with a larger graphical depiction of the golf hole as well as a more robust leader board for tournament play. Again, the leader board displays the scores of different golfers that may be playing in a tournament or for fun with the golfer.

Moreover, the large, screen apparatus 910b has a lot of flexibility and can perform a lot of functions including, allowing a foursome to use only one of these units, and performing tractor/grounds maintenance tasks as well as course mapping functions. The large screen apparatus 910b can be self-contained by obtaining power from a rechargeable battery or run off the cart 1012. An advantage of being self-contained is that the owner of the large screen apparatus 910b can lease these units to golf courses for a specific tournament or function.

In a circumstance where the golf course restricts the movement of golf carts to a cart path, the handheld apparatus 910a can be an appendage to the large screen apparatus 910b or replace the large screen apparatus 910b and provide a semi fixed unit that is held in a cradle and can be removed by the golfer.

As mentioned above, the large screen apparatus 910b is capable of operating a large amount of software as compared to the handheld apparatus 910a. This additional software can include:

Tractor/Grounds maintenance software 1114 which can provide the golf course personnel with the ability to better control assets, such as tractors and mowers. For instance, because, the positioning capability of impulse radio technology is so accurate (to less than 1") an operator can control the path of the tractor which could help avoid dropping chemicals over areas already covered. The tractor/ground maintenance software 1114 can be beneficial to the golf course in that it may help:
Reduce the cost of chemicals and seed.
Reduce the wear and tear on machinery.
Lower labor costs.
Satisfy EPA (Environmental Protection Agency) standards on chemical use.
Increase the preciseness of work done by greens keepers.
Monitor soil conditions by interacting with instruments inserted into the ground.
Accurately keep track of the time it takes to accomplish each task.

Course mapping software 1116 can provide the golf course personnel with an accurate display of the topography of the golf course, hole by hole. For instance, architects can use this product when designing a golf course and builders can use this product when constructing the golf course. In addition, the course mapping software 1116 can be used to accurately map the topography of an existing golf course in order to identify ways to improve drainage and to direct the flow of traffic on the golf course.

After completion of the round of golf, the golfer can download into the base station 920 the golf related information stored in apparatus 910. The base station 920 includes a processor 922 connected to a printer 924 that prints a score card 1014 (see FIG. 12 for an exemplary score card) that includes at least a portion of golf related information downloaded to the base station 920. For instance, the score card 1302 can illustrate a variety of golf related information including:

Score, plus or minus to par, and hole by hole.
Distance each shot was hit.
Comparison between present and previous rounds.
Comparison between the golfer and other golfers including the resident golf professional.
Areas of strength.
What fairways were hit in regulation.
What greens were hit in regulation
Distance each club was hit.
Promotions. For instance, suggesting a particular clinic based on a weakness of the golfer.
Number of penalties.
Number of putts.

The base station 920 forwards or downloads the golf related information to the server 930 (e.g., database server 930a) which can store all of the golf related information for that particular golfer and for other golfers. The server 930 (e.g., web site server 930c) can also post the golf related information on an Internet/Intranet web site 1016. The web site 1016 enables the golfer to view specific information about their golf game and also enables the golfer to compare their statistics with the statistics of other golfers (having the same handicap or age) that have played at that golf course 1000. For instance, the web site 1016 can provide the golfer with a wide-range of golf related information as follows:

Distance hit per club of comparable golfers that played that course that day and over the previous week.
Compare fairways hit, number of :putts, greens hit in regulation, score, etc.
Provide a graphical depiction of a golfer's entire round and where on each hole, each shot landed.
Provide the golfer the ability to forward to any wired golf course relevant statistics, such as, the distance they hit each club. These statistics would be used in apparatus 910 to provide the golfer with an accurate club selection based on their historical analysis. The golf related data can also be used to calculate, store and forward handicap information.

In addition, the web site 1016 can be designed such that it prompts the golfer to enter some details about their golfing experience, and their golf equipment including, for example, club make, club model, shaft type and head composite and golf ball type. This marketing information along with the other golf related information could be of interest to the golf course personnel and/or golf businesses that manufacture, distribute or market golf equipment.

For instance, when the golfer enters the web site 1016 they could be prompted to let the golf course 1000 know how satisfied they were with their golfing experience. The web site 1016 could ask the golfer the following questions:

How was the pace of play?

How was the condition of the course?

Would you come back and play the course again?

What other courses do you play in the area?

The golf course could use this information to quickly respond to any negative experiences of the golfer.

Also, when the golfer enters the web site 1016 they could be prompted to let the golf course 1000 know about their golf equipment including, for example, club make, club model, shaft type and head composite and golf ball type. This data could be compared to the golf related information associated with the distance and accuracy of that golfer's game. Of course, this information is important to club manufacturers and the public, and could have a profound effect on sales and marketing strategies of golf equipment manufacturers. Moreover, the web site 1016 could give the golfer an opportunity to communicate with and eventually play golf with other golfers of like abilities.

The web site 1016 could prompt the golfer to purchase software 1018 that organizes and retains some or all of the golf related information that was obtained during one or more rounds of golf played by that golfer. The software 1018 generally resides on a personal computer of the golfer. In addition, the software 1018 enables the golfer to view and compare golf related information obtained during several rounds of golf so that the golfer can identify problematic areas in their golf game. The software 1018 could also enable the golfer to replay a round of golf by showing the course layout and identifying where each shot landed on the golf course 1000. Moreover, the amount of detail associated with the golf related information stored in the software can be as detailed as the golfer would like, for example, the software could show the actual line and result of each putt hit at each hole.

In other words, the golfer could use the software 1018 to perform the following functions:

Analyze one or more rounds.

Identify golfing skills that have improved or still may need help.

Identify the distance hit on each shot with each club.

Identify the number of greens and fairways hit in regulation.

Identify the suggested line of play for the golf course according to a golf professional.

Graphically depict the entire round including each shot in moving sequence.

Basically, the software 1018 could provide the golfer with the ability to pull his/her data off the web site 1016 and to maintain that data over a long period of time. This is important because the web site 1016 may only maintain that data for a predetermined amount of time. Since, the software maintains historical data a main function could be to provide the golfer with graphs showing improvements and trends in the golfer's game. It will also provide the golfer with a running depiction of each hole played on each course and could even replay the golfers round in 3D showing either the actual course or a 3D model. This may be especially appealing when golfers play a once in a lifetime course, such as, Pebble Beach.

It is likely that since the handheld apparatus 910*a* is a small mobile unit there is a chance that theft may occur. One way to prevent theft is by telling the users that the handheld apparatus 910*a* is not transportable from one golf course to the next and that the handheld apparatus 910*a* is disabled outside the golf course. Two other measures are outlined below which may be used to help prevent the theft of the handheld apparatus 910*a*.

I. A five-step theft prevention plan includes the following actions:

Kiosk 940 informs the golfer that the handheld apparatus 910*a* is disabled outside the golf course 1000 and must be returned.

Golf course personnel obtain the name and phone number of the user of each handheld apparatus 910*a*.

Handheld apparatus 910 instructs, the golfer at the end of the round to go to the clubhouse and return the handheld apparatus 910*a* and pick up the score card 1014.

Base station 920 does not generate the score card 1014 until the handheld apparatus 910*a* is returned to its cradle.

Golf course personnel can contact the golfer associated with the missing handheld unit 910*a* if the golfer interacted with web site 1016.

II. In the case the five-step prevention plan fails, then a three-phase alert plan can be initiated as follows:

Phase one is initiated as the handheld apparatus 901*a* approaches within 10 feet (for example) of a boundary or parking lot. A warning signal is emitted to tell the golfer that the handheld apparatus 910*a* must be returned to the clubhouse.

Phase two is initiated as the handheld apparatus passes the boundary or enters the parking lot. A loud-warning signal is emitted to tell the golfer that the handheld apparatus 910*a* must be returned to the clubhouse.

Phase three is initiated as the handheld apparatus has left the grounds of the golf course 1000. A piercing warning siren is emitted and the display will warn the golfer to return the handheld apparatus 910*a* to the clubhouse.

To teach a golfer how the system 900 operates prior to playing golf, a kiosk 940 may be provided near the clubhouse and operate to inform the golfer as to the capabilities of the apparatus 910. To accomplish this purpose, the kiosk 940 may continually play infomercials that perform the following tasks:

Inform the golfer as to what they may obtain using the apparatus 910 including:

Distance to the pin.

Distance to hazards.

Distance of previous shot.

Score.

Ability to connect foursomes in real-time play.

Enable golfer to create their own game.

Offer the golfer and the clubhouse with a means of communication.

Help golf course personnel to control pace of play.

Print score card at the end of the round.

Information about the web site 1016.

Information about the software.

Inform the golfer as to how to obtain and evaluate the score card 1014.

Instruct the golfer on how to use the apparatus 910.

As mentioned above, there are many other types of users of the golf related information including, for example, golf course personnel, golf trainers, and golf businesses besides the golfer that can benefit from using golf related information obtained in accordance with the present invention. Some of these benefits are described below with respect to the different operational aspects of the present invention.

Referring to FIG. 13, there is a flowchart illustrating the basic steps of a preferred method 1300 for obtaining and managing golf related information in accordance with the present invention. Basically, the preferred method 1300 includes step 1302 where some of the golf related information is obtained from a user (e.g., golfer) and some of the golf related information is obtained from a network of impulse radio units 912 and 1002 distributed throughout a golf course 1000. At step 1304, at least a portion of the golf related information that was obtained in step 1302 is provided back to the same user and/or different users.

Referring to FIG. 14, there is flowchart illustrating in greater detail the obtaining step 1302 of method 1300 shown in FIG. 13 when a user of the golf related information is a golfer. As described above, the golfer can interact with and input all types of golf related information into the apparatus 910 during a round of golf. Generally, the golfer provides the apparatus 910 with the same type of golf related information for each hole of golf played. For example, at step 1402, the apparatus 910 receives an indication from the golfer as to what golf club was used for each golf shot. At step 1404, the apparatus 910 could receive an indication from the golfer as to whether a particular fairway was hit in regulation. At step 1406, the golfer may indicate to the apparatus 910 whether or not they where able to hit a particular green in regulation. Then at step 1408, the apparatus 910 may receive an indication from the golfer as to how many putts (if any) were needed on a particular hole. Also at step 1410, the golfer may indicate to the apparatus 910 whether or not any penalty strokes should be assessed on a particular hole. The golfer could also indicate to the apparatus 910, at step 1412, how many strokes should be assessed on a particular hole. Of course, the golfer is able to electronically record the golf related information that was obtained during a round of golf.

It should be understood that the apparatus 910 could obtain some of this golf related information (e.g., number of fairways hit) through communications between the impulse radio units 912, 1002a, 1002b, 1002c and 1002d without having to communicate with the golfer.

Figure 15:
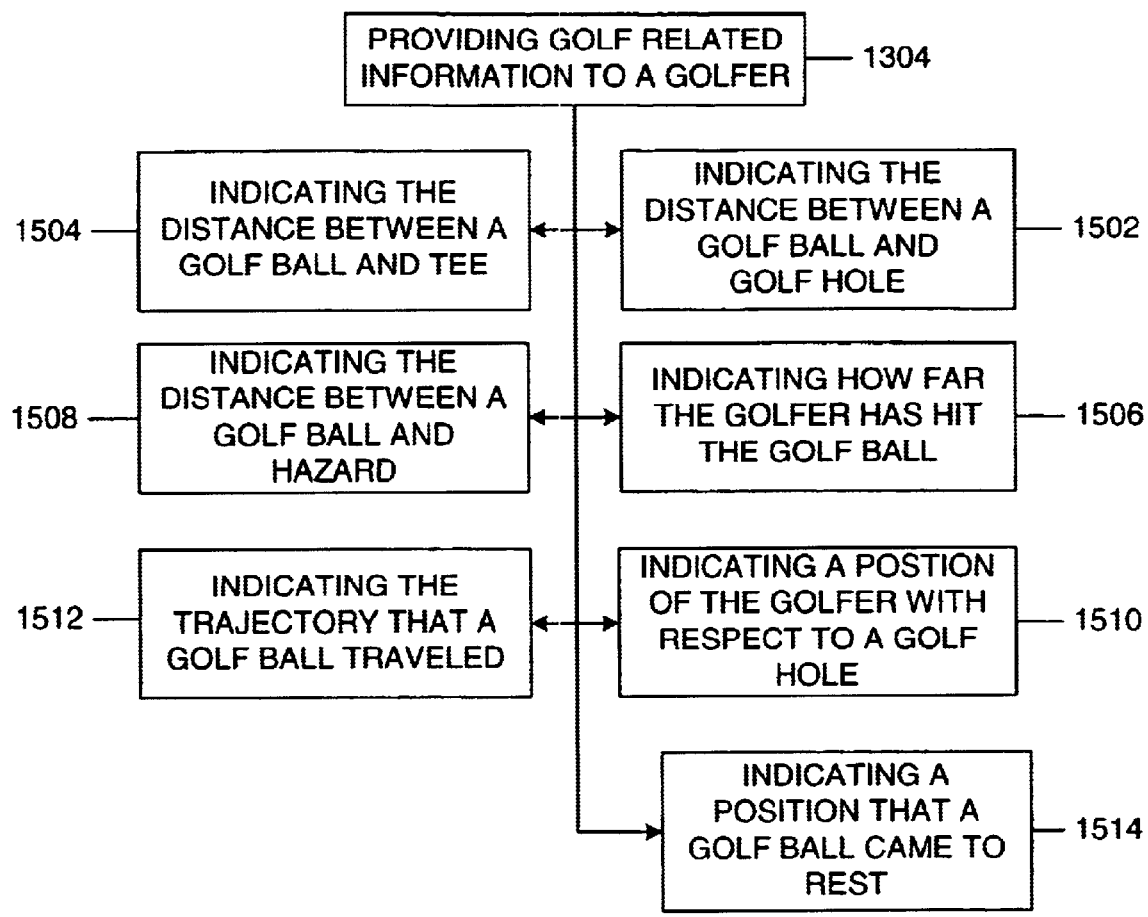
FIG. 15 is a flowchart illustrating in greater detail a providing step of the method shown in FIG. 13, wherein a user of the golf related information is a golfer.

Referring to FIG. 15, there is flowchart illustrating in greater detail the providing step 1304 of method 1300 shown in FIG. 13 when a user of the golf related information is a golfer. As described above, the golfer can be provided with a variety of golf related information while playing a round of golf.

For example, at step 1502, the golfer can be provided with an indication from the apparatus 910 as to the distance "a" between a golf ball 1006 and the golf hole 1004 (see FIG. 10). For the apparatus 910 to accomplish this task, the golfer would normally have had to interact with and inform the apparatus 910 as to the current position of the golf ball 1006 which is shown next to the apparatus. This interaction between the golfer and apparatus 910 could be done in any fashion such as, for example, depressing a "mark-the-ball" button on the apparatus 910 or using speech recognition technology. Since, the apparatus 910 is usually handheld by the golfer then the current position of the apparatus and the golf ball 1006 are usually the same.

At step 1504, the golfer can be provided with an indication from the apparatus 910 as to the distance "b" between the golf ball 1006 and a particular tee 1008a, 1008b or 1008c in the tee-off area 1008 (see FIG. 10). Prior to receiving this type of golf related information and similar to step 1502, the golfer would normally have to interact with and inform the apparatus 910 as to the current position of the golf ball 1006. However, if the current position of the golf ball 1006 has already been determined, then the apparatus 910 would not have to recalculate the current position of the golf ball 1006.

At step 1506, the apparatus 910 can provide the golfer with an indication as to how far the golfer hit the golf ball 1006. Step 1506 is different than step 1504, because the golf ball was not hit from the tee-off area 1008. To calculate this distance, the apparatus 910 would need to remember the previous location of the golf ball 1006 and compare that information to the current location of the golf ball.

At step 1508, the golfer can be provided with an indication from the apparatus 910 as to the distance "c" between the golf ball 1006 and the hazard 1010 (see FIG. 10). Like the previous steps 1502 and 1504, the golfer would normally have to interact with and inform the apparatus 910 as to the current position of the golf ball 1006 prior to receiving this type of golf related information. However, if the current position of the golf ball 1006 was already determined in either step 1502 or 1504., then the apparatus 910 would not have to recalculate the current position of the golf ball. If the golfer desires, the apparatus 910 is capable of providing the golfer with multiple distances including distance "a", distance "b" and distance "c".

At step 1510, the apparatus 910 can provide the golfer with an indication of the golfer's position with respect to the golf hole. To calculate this position, the apparatus 910 (located near the golfer) would need to interact with at least two beacon impulse radio units 1002e. Basically, the beacon impulse radio units 1002e interact with and provide the apparatus 910 with their reference points to enable the apparatus to triangulate and determine its position on the golf course 1000.

At step 1512, the apparatus 910 can provide the golfer with an indication as to the trajectory that the golf ball traveled for a particular shot. This ability of 3D tracking of the golf ball may be in a limited area such as a driving range.

At step 1514, the apparatus 910 can provide the golfer with an indication as to the position that the golf ball came to rest after being hit by the golfer.

Figure 16:
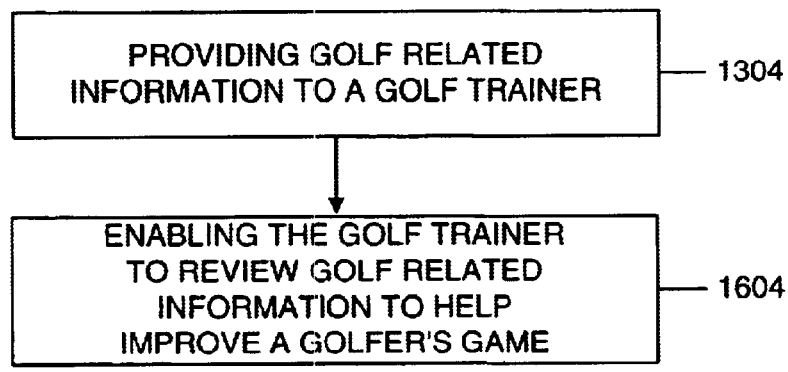
FIG. 16 is a flowchart illustrating in greater detail a providing step of the method shown in FIG. 13, wherein a user of the golf related information is a golf trainer.

Referring to FIG. 16, there is flowchart illustrating in greater detail the providing step 1304 of method 1300 shown in FIG. 13 when a user of the golf related information is a golf trainer. Basically, the golf trainer could obtain all of the golf related information associated with a particular golfer that the apparatus 910 downloaded into the base station 920 or server 930. Then at step 1602, the golf trainer can review this golf related information which would enable the golf trainer to focus in on the type of lessons that may help improve the game of a golfer.

Figure 17:
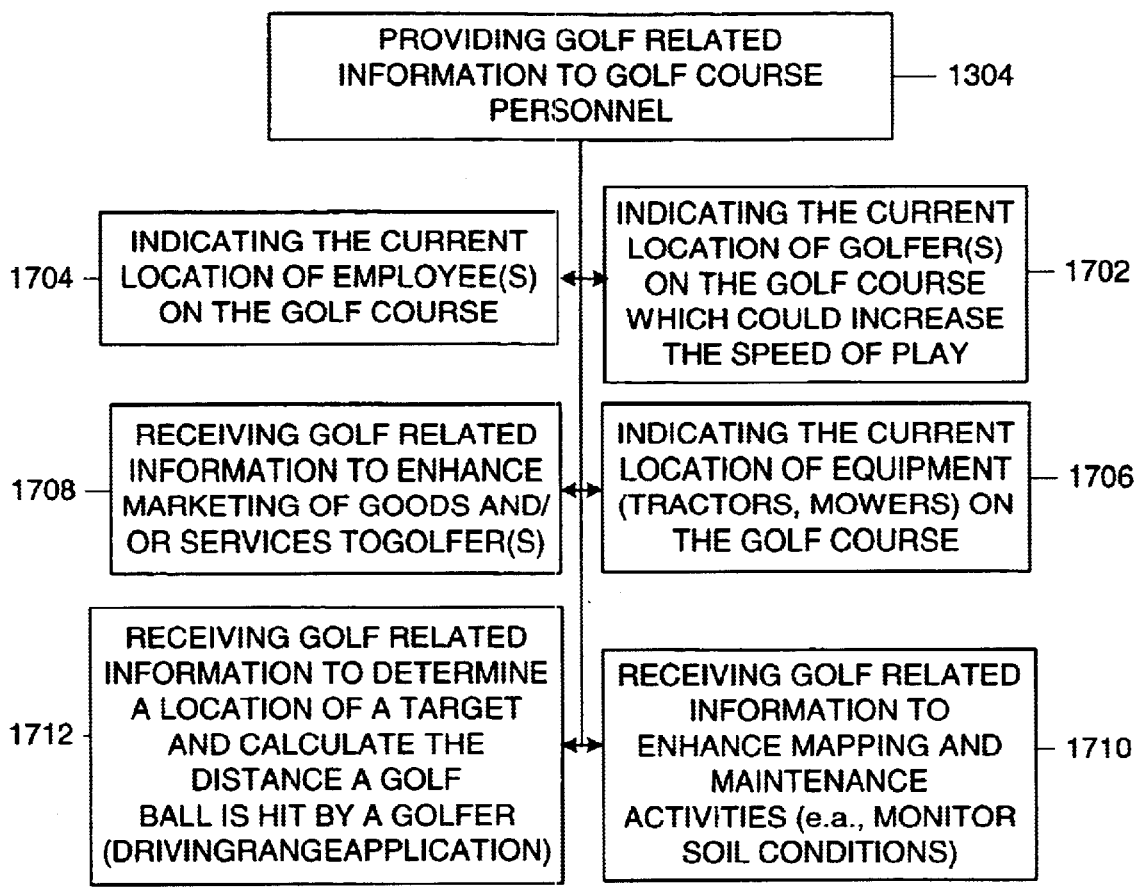
FIG. 17 is a flowchart illustrating in greater detail a providing step of the method shown in FIG. 13, wherein a user of the golf related information is golf course personnel.

Referring to FIG. 17, there is a flowchart illustrating in greater detail the providing step 1304 of method 1300 shown in FIG. 13 when a user of the golf related information is golf course personnel. The golf course personnel (e.g., managers, rangers, starters and laborers) may interact with system 900 and monitor the golf related information that was obtained by the system to help manage the basic operations of the golf course and increase the profitability of the golf course. As such, the golf course personnel is likely to be interested in golf related information that is different than the type of golf related information that would interest a golfer or golf trainer.

For example at step 1702, the golf course personnel may interact with the system 900 to monitor the current position of one or more golfers playing on the golf course 1000. Of course, each golfer would have to carry the apparatus 910 or some type of impulse radio unit 1002 that would enable the system 900 to track their current position. This type of golf related information is valuable to the golf course personnel, because it would enable the golf course personnel to speed up play which, in turn, would result in more rounds of golf being played on the golf course.

At step 1704, the golf course personnel may receive an indication from the system 900 as to the current position of one or more employees working on the golf course 1000. Like the golfers, each employee would have to carry the apparatus 910 or some type of impulse radio unit 1002 that would enable the system 900 to track their current position. This type of golf related information is valuable to the golf course personnel, because it would enable the golf course personnel to better monitor and control their labor costs.

At step 1706, the golf course personnel may receive an indication from the system 900 as to the current position of each piece of equipment located on the golf course 1000. Like the golfers and employees, each piece of equipment would have to carry the apparatus 910 or some type of impulse radio unit 1002 that would enable the system 900 to track their current position. This type of golf related information is valuable to the golf course personnel because it would enable the golf course personnel to better manage the use of their equipment. For example, the golf course personnel could keep track of the location of mowers and manage the distribution of chemicals from tractors.

It should be understood that a particular employee can be associated with a particular piece of equipment and, as such, only one of them need carry the apparatus 910 or impulse radio unit 1002.

At step 1708, the golf course personnel may receive golf related information that would enable them to enhance the marketing of goods and/or services to a golfer.

At step 1710, the golf course personnel may receive golf related information that would enable them to enhance mapping and maintenance activities. For instance, the golf course personnel may monitor soil conditions by receiving golf related information from impulse radio units that interact with sensors in the soil.

At step 1712, the golf course personnel may receive golf related information that would enable them to determine a location of a target (e.g., pin) and calculate a distance a golfer hits a golf ball with a particular golf club.

Figure 18:
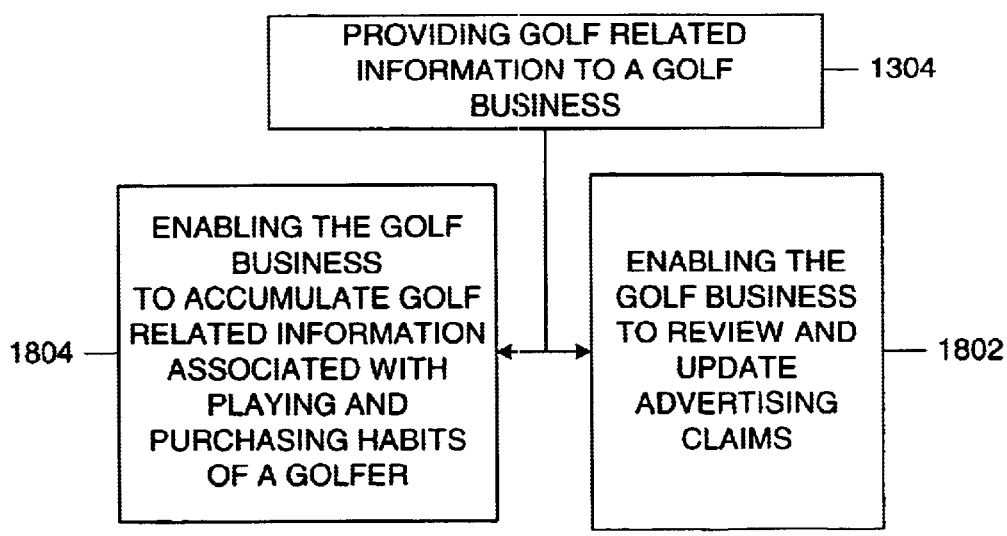
FIG. 18 is a flowchart illustrating in greater detail a providing step of the method shown in FIG. 13, wherein a user of the golf related information is in the golf business.

Referring to FIG. 18, there is flowchart illustrating in greater detail the providing step 1304 of method 1300 shown in FIG. 13 when a user of the golf related information is in the golf business. At step 1802, the server 930 could provide golf businesses (e.g., golf equipment manufacturers) with golf related information including, for example, the type and make of the golf clubs used by particular golfers and how this equipment performed for those golfers. For example, the golf business could use this golf related information to verify or update any advertising claims associated with the performance of a particular brand of golf equipment.

At step 1804, the golf business may receive golf related information associated with the playing and purchasing habits of the golfers. In turn, the golf business may use this information in web site marketing activities.

Figure 19:
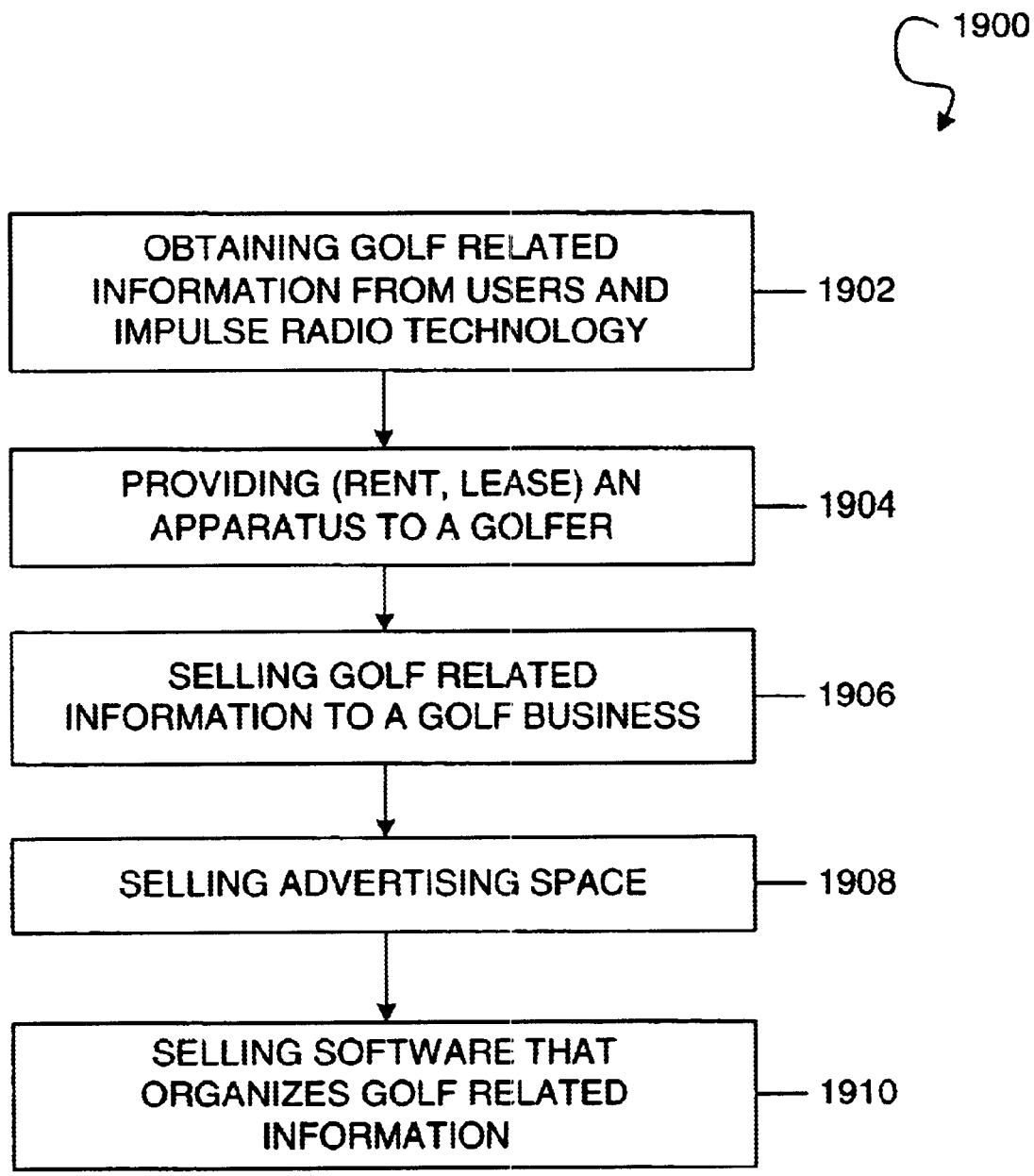
FIG. 19 is a flowchart illustrating the basic steps of an exemplary method for generating revenue by providing golf related information to at least one user in accordance with the present invention.

Referring to FIG. 19, there is a flowchart illustrating the basic steps of an exemplary method 1900 for generating revenue by providing golf related information to at least one user in accordance with the present invention. Basically, the preferred method 1900 includes step 1902 where the system 900 obtains some of the golf related information from a user (e.g., golfer) and some of the golf related information from a network of impulse radio units 912 and 1002 distributed throughout the golf course 1000.

At step 1904, the golf course can provide (e.g., rent, lease) a golfer with an apparatus 910 capable of calculating additional golf related information using already obtained golf related information and further capable of displaying this calculated golf related information to the golfer. As mentioned earlier, the golfer can carry the apparatus 910 onto the golf course 1000.

At step 1906, the golf course 1000 can sell at least a portion of the golf related information to a golf business (e.g., marketing firm). More specifically, the golf related information that was downloaded to the server 910 could be formatted in a predetermined manner and sold to various types of golf businesses.

At step 1908, the golf course could sell advertising space to a buyer that can be used to display advertisements at the apparatus 910 or the web site 1016.

At step 1910, the golf course could sell software to golfers. As mentioned earlier, the software operates to organize and store the golf related information that is obtained during one or more rounds of golf that was played by a golfer.

Figure 20:
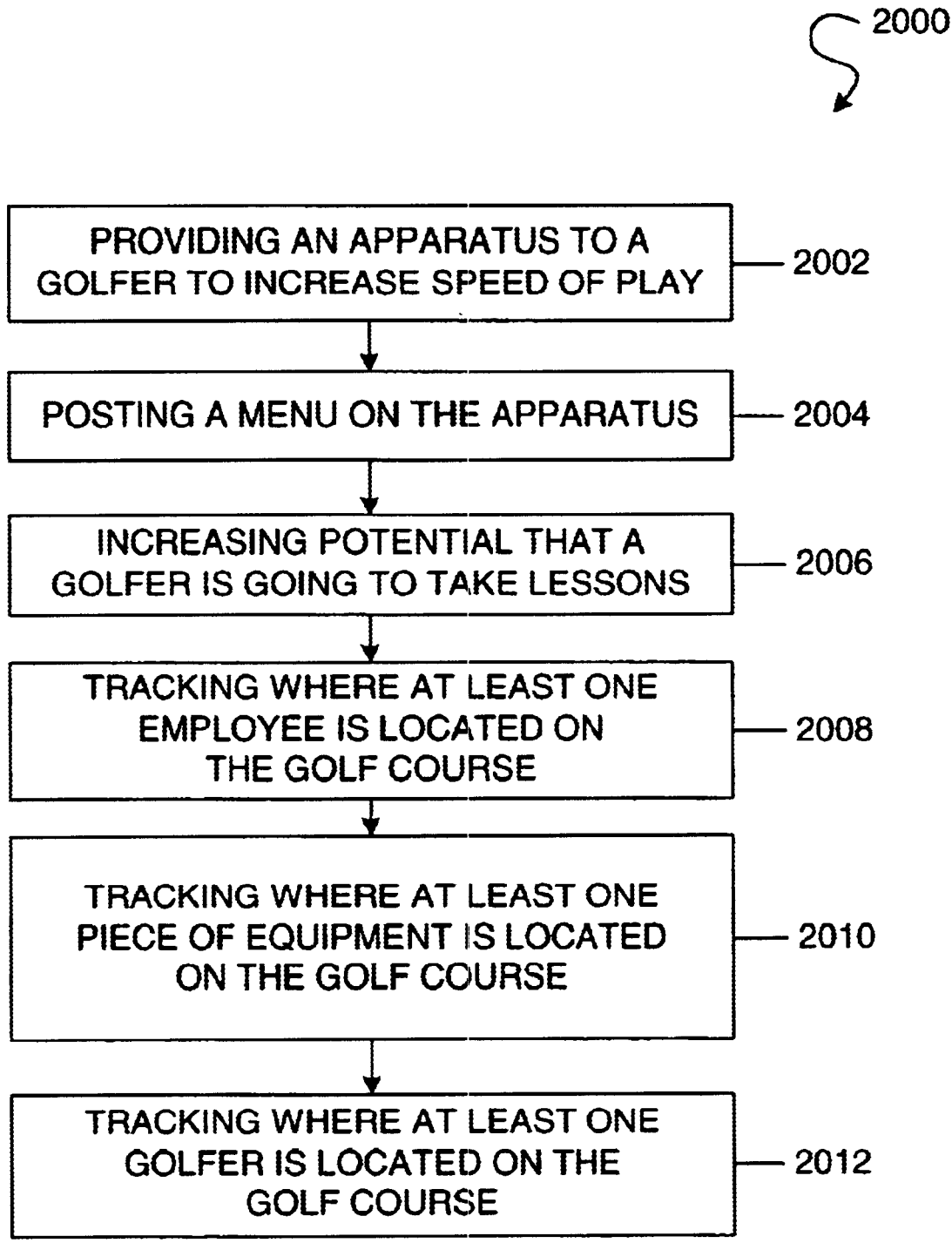
FIG. 20 is a flowchart illustrating the basic steps of an exemplary method for increasing the profitability of a golf course in accordance with the present invention.

Referring to FIG. 20, there is a flowchart illustrating the basic steps of an exemplary method 2000 for increasing the profitability of a golf course in accordance with the present invention. Beginning at step 2002, the golf course 1000 could provide a golfer with an apparatus 910 capable of using impulse radio technology to aid in determining a distance that a golf ball 1006 is located from a golf pin 1004. This would eliminate the need for the golfer to pace of distances when playing golf which would result in an increase in the speed of play of the golfer.

At step 2004, the golf course 1000 could post a menu within the apparatus 910 while the golfer is playing on the golf course. This could increase the revenue to a golf course by enabling the golfers using the apparatus. 910 to see and order from a displayed menu while still out on the golf course. In addition, the golfer may use the apparatus 910 to page a golf course employee and have them come by and sell them food or beverages while on the golf course.

At step 2006, the golf course 1000 can increase the potential that the golfer is going to take lessons. Because, a golf trainer can review golf related information that was stored in the apparatus 910 while the golfer was playing golf on the golf course.

At step 2008, the golf course 1000 can track where at least one employee is currently located on a golf course. Again, this type of information is valuable to the golf course, because it would enable the golf course personnel to better monitor and control their labor costs.

At step 2010, the golf course 1000 can track where at least one piece of equipment is currently located on a golf course. Again, this type of information is valuable to the golf course personnel, because it would enable the golf course personnel to better manage the use of their equipment. For example, the golf course personnel could keep track of the location of mowers and manage the distribution of chemicals from tractors.

At step 2012, the golf course 1000 can track where at least one golfer is currently located on a golf course. Again, this type of information is valuable to the golf course, because it would enable the golf course personnel to speed up play which, in turn, would result in more rounds of golf being played on the golf course.

Figure 21:
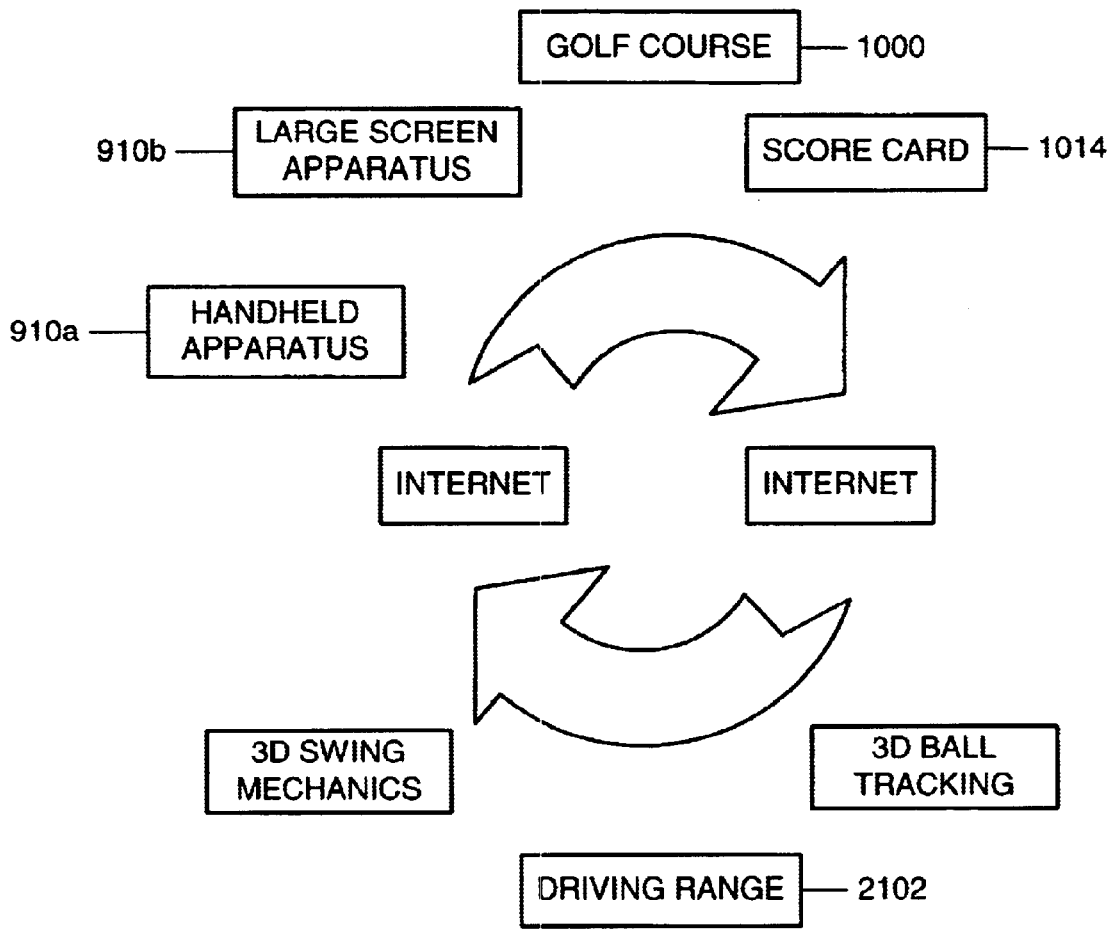
FIG. 21 is a block diagram illustrating the interaction between a golf course and driving range in accordance with the present invention.

Referring to FIG. 21, there is illustrated an exemplary interaction that may occur between a golf course and driving range to help improve a golfer's game in accordance with the present invention. The golf course 1000 and the driving range 2102 may communicate by way of the Internet 2104. For instance, the golfer may visit a driving range 2102 including a system (similar to system 900) that has the ability to track the swing mechanics of the golfer and/or the ability to track the flight of a golf ball hit by the golfer. By tracking the swing mechanics of the golfer, a golf trainer can help improve the game of the golfer by comparing (on the web site 1016) the golfer's swing mechanics to a professional's swing mechanics. The 3D ball tracking and 3D swing mechanics at the driving range 2102 may lead a golfer to a similar system 900 at the golf course 1000. The apparatuses 910*a* and 910*b* at the golf course 1000 could illuminate various weaknesses in the golfer's game which could lead the golfer back to the driving range 1202.

It should be understood that impulse radio technology enables the apparatus 910 to communicate with the server 930 (e.g., Internet) at approximately 10 megabits per second. This high bandwidth means that full video could be wirelessly transmitted to and from the apparatus 910 located on a golf course 1000. Thus, a person could watch another golfer play golf from anywhere in the world via. the Internet.

It should also be understood that the present invention by utilizing impulse radio technology has distinct advantages over traditional systems that use GPS based technology. One main advantage is that impulse radio technology supports communications, positioning and radar functionality while GPS based technology supports only positioning technology. Following is a table comparing impulse radio technology to GPS based technology:

a golfer, a golf trainer, a golf business and golf course personnel. Also, the methods disclosed enables golf course personnel to manage and increase the profitability of a golf course.

Although various embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for managing golf related information, said method comprising the steps of:

obtaining some of the golf related information using impulse radio technology; and providing at least a portion of the golf related information to golf course personnel, where said step of providing further includes the step of:

providing the golf course personnel with information about a position of a golfer located on a golf course, wherein the position of the golfer is determined from the interaction between an ultra wideband impulse radio unit associated with the golfer and at least two beacon ultra wideband impulse radio units distributed at known locations throughout the golf course.

2. The method of claim 1, wherein said step of providing at least a portion of the golf related information to the golf

| FEATURES | IMPULSE RADIO TECH. | GPS TECHNOLOGY |
|---|---|---|
| Reliability | No need for correction | Needs correction to achieve marginal Accuracy |
| | Base station to mobile R/F Connection not critical | Base station to mobile R/F link is vital to operation |
| | No relying on Gov't controlled GPS system | GPS goes down for maintenance and Military access priority |
| | No outer space interference | GPS disrupted by solar storms And meteor showers |
| | No atmospheric interruptions or problems | Atmospheric problems are real |
| | Foliage penetration capability No R/F multi-path signal cancellation | Foliage blocking of signal R/F multi-path cancellation loss of signal/loss of operation near bldg. |
| | Immune to RF interference | Disrupted by local in-band interference |
| Communication | Dual function/same equipment Does position and communication | Separate system/separate equipment added infrastructure and cost |
| Accuracy | Less than 1" (no delay) | 1.5 to 3 meters (marginal accuracy) |
| Acquisition Time to positional fix | No delay-instantaneous | Hot start 5 to 20 seconds (plus few second processing delay) |
| Size | Pager Size | Larger-much larger (cart size) |
| Cost | Lower | Higher |
| Flexibility | Tremendous flexibility for walkers, riders, personnel, assets, tractors, number of units per course, etc. | Little flexibility permanently attached to carts |
| Advanced feature potential | Ball tracking Swing mechanics Club tracking Local wind/greens conditions Tractor chemical control Real-time leader board Peer to Peer communication | Can't do Can't do Can't do Difficult and costly Accuracy problem can't effectively do Difficult and costly Difficult and costly |

From the foregoing, it can be readily appreciated by those skilled in the art that the present invention provides a system, apparatus and method for providing golf related information to several types of users including, for example, course personnel includes the step of enabling the golf course personnel to accelerate rate of play at the golf course by knowing the position of the golfer and communicating with the golfer, wherein the golf course personnel can use another ultra wideband impulse radio unit to establish communications with the golfer using the ultra wideband impulse radio unit, wherein the ultra wideband impulse radio unit is used to determine the position of the golfer and is also used to establish communications between the golf course personnel and the golfer.

3. The method of claim 1, wherein said step of providing at least a portion of the golf related information to the golf course personnel includes the step of enabling the golf course personnel to enhance marketing of goods to the golfer.

4. The method of claim 1, wherein said step of providing at least a portion of the golf related information to the golf course personnel includes the step of enabling the golf course personnel to enhance mapping and maintenance activities.

5. The method of claim 1, wherein said step of providing at least a portion of the golf related information to the golf course personnel includes the step of enabling the golf course personnel to calculate a distance the golfer hits a golf ball with a particular golf club.

6. The method of claim 1, wherein said step of providing at least a portion of the golf related information to the golf course personnel includes the step of enabling the golf course personnel to monitor soil conditions.

7. The method of claim 6, wherein the monitored soil conditions are communicated to a central location.

8. The method of claim 1, wherein said step of providing at least a portion of the golf related information to the golf course personnel includes the step of determining and indicating a position where an employee is currently located on the golf course, wherein the position of the employee is determined from the interaction between an ultra wideband impulse radio unit associated with the employee and at least two beacon ultra wideband impulse radio units distributed at known locations throughout the golf course.

9. The method of claim 1, wherein said step of providing at least a portion of the golf related information to the golf course personnel includes the step of determining and indicating a position where a piece of equipment is currently located on the golf course wherein the position of the piece of equipment is determined from the interaction between an ultra wideband impulse radio unit associated with the piece of equipment and at least two beacon ultra wideband impulse radio units distributed at known locations throughout the golf course.

10. A method for managing a golf course, said method comprising the steps of:
    obtaining golf related information using impulse radio technology; and
    using the golf related information to increase the profitability of the golf course by monitoring a position where a golfer is currently located on the golf course, wherein the position of the golfer is determined from the interaction between an ultra wideband impulse radio unit associated with the golfer and at least two beacon ultra wideband impulse radio units distributed at known locations throughout the golf course.

11. The method of claim 10, wherein said step of using the golf related information to increase the profitability of the golf course includes, the step of monitoring where an employee is currently located on the golf course, wherein the position of the employee is determined from the interaction between an ultra wideband impulse radio unit associated with the employee and at least two beacon ultra wideband impulse radio units distributed at known locations throughout the golf course.

12. The method of claim 10, wherein said step of using the golf related information to increase the profitability of the golf course includes the step of monitoring where a piece of equipment is currently located on the golf course, wherein the position of the piece of equipment is determined from the interaction between an ultra wideband impulse radio unit associated with the piece of equipment and at least two beacon ultra wideband impulse radio units distributed at known locations throughout the golf course.

13. A method for generating revenue from at least one source, said method comprising the steps of:
    obtaining golf related information using impulse radio technology;
    providing a golfer with a unit capable of calculating additional golf related information using the obtained golf related information and further capable of displaying the calculated additional golf related information to the golfer, wherein the calculated additional golf related information includes a distance that a golf ball is located from a golf pin where the distance that the golf ball is located from the golf pin is calculated by:
        determining a position of the golfer located near the golf ball from the interaction between an ultra wideband impulse radio unit associated with the golfer and at least two beacon ultra wideband impulse radio units distributed at known locations throughout the golf course; and
        calculating a distance between the determined position of the golfer and a known position of the golf pin; and
    enabling golf course personnel to enhance marketing of goods to the golfer by communicating with the golfer, wherein the golf course personnel can use another ultra wideband impulse radio unit to establish communications with the golfer using the ultra wideband impulse radio unit, wherein the ultra wideband impulse radio unit is used to determine the position of the golfer and is also used to establish communications between the golf course personnel and the golfer.

14. A method for increasing the profitability of a golf course, said method comprising the step of:
    providing a golfer with a unit capable of using impulse radio technology to aid in determining a distance that a golf ball is located from a golf pin thus eliminating a need for the golfer to pace of a distance when playing golf on the golf course which results in speeding up the play of the golfer, wherein the distance that the golf ball is located from the golf pin is calculated by:
        determining a position of the golfer located near the golf ball from the interaction between an ultra wideband impulse radio unit associated with the golfer and at least two beacon ultra wideband impulse radio units distributed at known locations throughout the golf course; and
        calculating a distance between the determined position of the golfer and a known position of the golf pin.

15. A method for managing golf related information, said method comprising the steps of:
    obtaining golf related information using impulse radio technology; and
    providing at least a portion of the golf related information to at least one of a plurality of users, wherein the plurality of users include a golfer, a golf trainer, a golf course personnel and a golf business, wherein the golf course personnel is provided information about a position of the golfer located on a golf course, wherein the position of the golfer is determined from the interaction between an ultra wideband impulse radio unit associated with the golfer and at least two beacon ultra wideband impulse radio units distributed at known locations throughout the golf course.

16. An apparatus comprising:

a display;

an ultra wideband impulse radio unit;

a user interface; and a controller, coupled to said display, said ultra wideband impulse radio unit and said user interface, capable of providing a golfer with at least a portion of golf related information that was obtained utilizing impulse radio technology, wherein the golfer is provided information about a position of the golfer relative to a golf pin on a golf course, wherein the position of the golfer is determined from the interaction between the ultra wideband impulse radio unit associated with the golfer and at least two beacon ultra wideband impulse radio units distributed at known locations throughout the golf course.

17. A base station comprising:

a processor capable of receiving golf related information from an apparatus that was used by a golfer, said apparatus including:

a display;

an ultra wideband impulse radio unit:

a user interface;

a controller, coupled to said display, said ultra wideband impulse radio unit and said user interface, capable of obtaining a portion of the golf related information utilizing impulse radio technology and further capable of obtaining another portion of the golf related information by interacting with the golfer; and said controller capable of providing the golfer with information about a position of the golfer relative to a golf pin on a golf course, wherein the position of the golfer is determined from the interaction between an ultra wideband impulse radio unit associated with the golfer and at least two beacon ultra wideband impulse radio units distributed at known locations throughout the golf course; and said processor is further capable of generating a score card illustrating at least a portion of the golf related information.

18. A server comprising:

a web site capable of receiving and displaying golf related information from an apparatus that was used by a golfer, said apparatus including:

a display;

an ultra wideband impulse radio unit;

a user interface;

a controller, coupled to said display, said ultra wideband impulse radio unit and said user interface, capable of obtaining a portion of the golf related information utilizing impulse radio technology and further capable of calculating another portion of the golf related information by interacting with the golfer, and said controller capable of providing the golfer with information about a position of the golfer relative to a golf pin on a golf course, wherein the position of the golfer is determined from the interaction between an ultra wideband impulse radio unit associated with the golfer and at least two beacon ultra wideband impulse radio units distributed at known locations throughout the golf course.

19. The server of claim 18, wherein said web site is further capable of downloading at least a portion of the golf related information to a software program.

20. A system capable of managing golf related information, said system comprising:

an apparatus including:

a display;

an ultra wideband impulse radio unit;

a user interface;

a controller, coupled to said display, said ultra wideband impulse radio unit and said user interface, capable of providing a golfer with golf related information that was obtained in part by utilizing impulse radio technology; and said controller capable of providing the golfer with information about a position of the golfer relative to a golf pin on a golf course, wherein the position of the golfer is determined from the interaction between an ultra wideband impulse radio unit associated with the golfer and at least two beacon ultra wideband impulse radio units distributed at known locations throughout the golf course; and a base station capable of receiving golf related information from said apparatus and further capable of generating a score card illustrating at least a portion of the golf related information; and a server including a web site capable of receiving the golf related information from said base station.

21. A method of managing golf-related information for golf course personnel, comprising:

a. obtaining, via an impulse radio signal, information associated with a golf course;

b. processing the obtained golf-related information; and c. providing the processed golf-related information to the golf course personnel to assist at least one person of such personnel in making at least one decision respecting the golf course, wherein said at least one person is provided information about a position of a golfer located on a golf course, wherein the position of the golfer is determined from the interaction between an ultra wideband impulse radio unit associated with the golfer and at least two beacon ultra wideband impulse radio units distributed at known locations throughout the golf course.

* * * * *